(12) United States Patent
Miyauchi

(10) Patent No.: US 8,125,174 B2
(45) Date of Patent: Feb. 28, 2012

(54) MOTOR DRIVEN ELECTRONIC APPARATUS

(76) Inventor: Norio Miyauchi, Ibaraki (JP)

( * ) Notice: Subject to any disclaimer, the term of this patent is extended or adjusted under 35 U.S.C. 154(b) by 546 days.

(21) Appl. No.: 12/309,466

(22) PCT Filed: Jul. 3, 2007

(86) PCT No.: PCT/JP2007/000727
§ 371 (c)(1),
(2), (4) Date: Jan. 21, 2009

(87) PCT Pub. No.: WO2008/018162
PCT Pub. Date: Feb. 14, 2008

(65) Prior Publication Data
US 2009/0251095 A1    Oct. 8, 2009

(30) Foreign Application Priority Data

Aug. 7, 2006  (JP) ................................ 2006-214494
May 28, 2007  (JP) ................................ 2007-139810

(51) Int. Cl.
 *H02P 8/02* (2006.01)
 *H02P 8/04* (2006.01)
(52) U.S. Cl. ...................................... 318/685; 318/696
(58) Field of Classification Search .................. 318/685, 318/696, 700, 701
See application file for complete search history.

(56) References Cited

U.S. PATENT DOCUMENTS

| 4,282,471 | A | * | 8/1981 | Budniak et al. ............... 318/685 |
| 4,480,218 | A | * | 10/1984 | Hair .............................. 318/696 |
| 5,327,053 | A | * | 7/1994 | Mann et al. ............. 318/400.35 |
| 5,973,469 | A | | 10/1999 | Higuchi et al. |

FOREIGN PATENT DOCUMENTS

| JP | 6-235777 | 8/1994 |
| JP | 3258125 | 12/2001 |
| JP | 3645908 | 2/2005 |
| JP | 3808510 | 5/2006 |
| JP | 2007-104796 | 4/2007 |
| WO | WO 96/18237 | 6/1996 |

* cited by examiner

*Primary Examiner* — Bentsu Ro
(74) *Attorney, Agent, or Firm* — McGinn IP Law Group, PLLC

(57) ABSTRACT

A driving method of a high speed rotation stepping motor exhibiting good starting performance, its driving circuit, and a vibration motor and a fan motor employing them. The motor driven electronic apparatus comprises a two pole flat stator, a rotor consisting of a two pole permanent magnet coupling magnetically with the two pole flat stator through a gap, stopping with detent torque and secured to the rotor shaft, and a drive coil. The motor driven electronic apparatus is characterized in that at least any one of the reference voltage of an amplifier constituting a rotor position detector and the reference voltage of a comparator constituting the rotor position detector are used more than one.

21 Claims, 27 Drawing Sheets

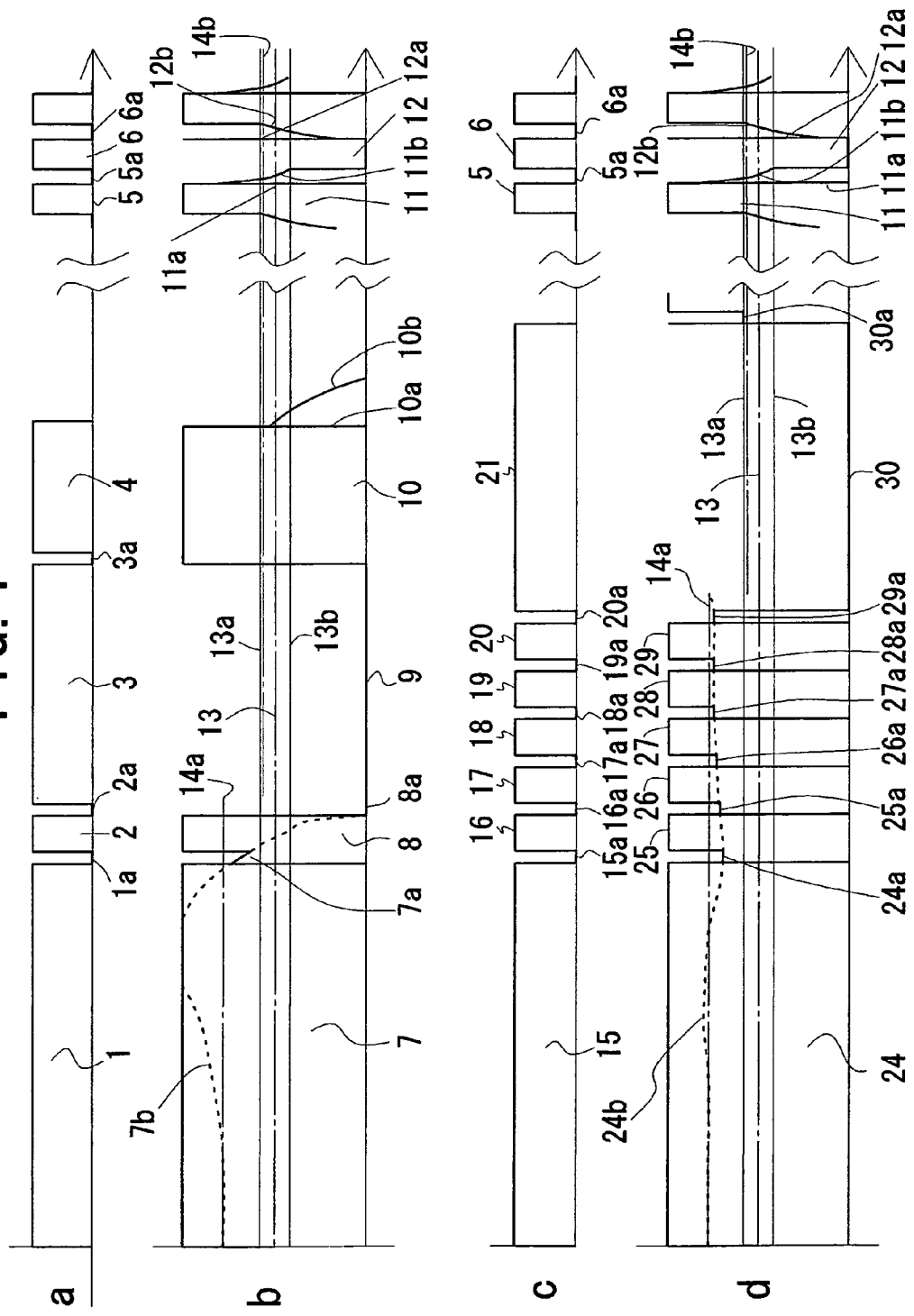

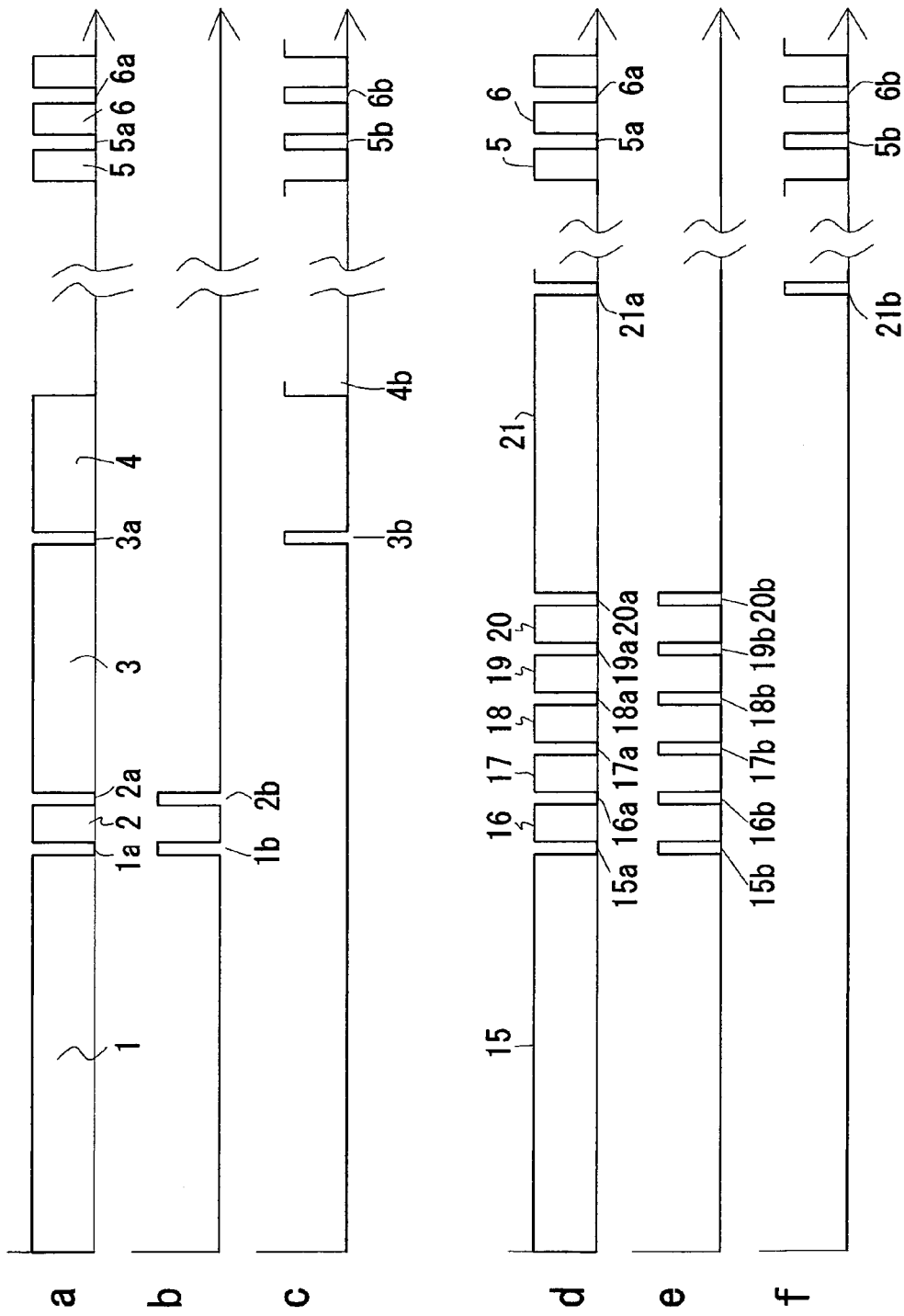

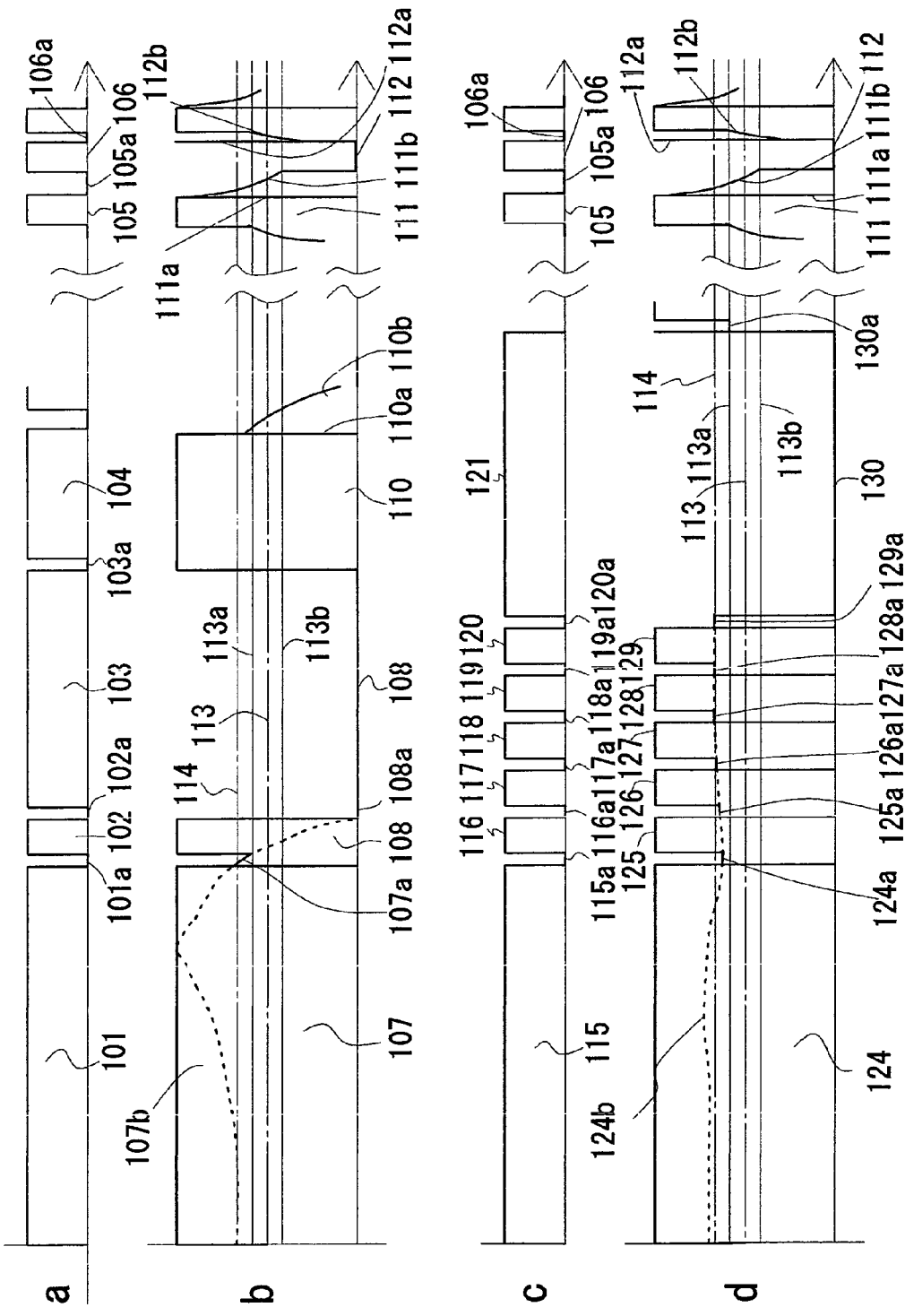

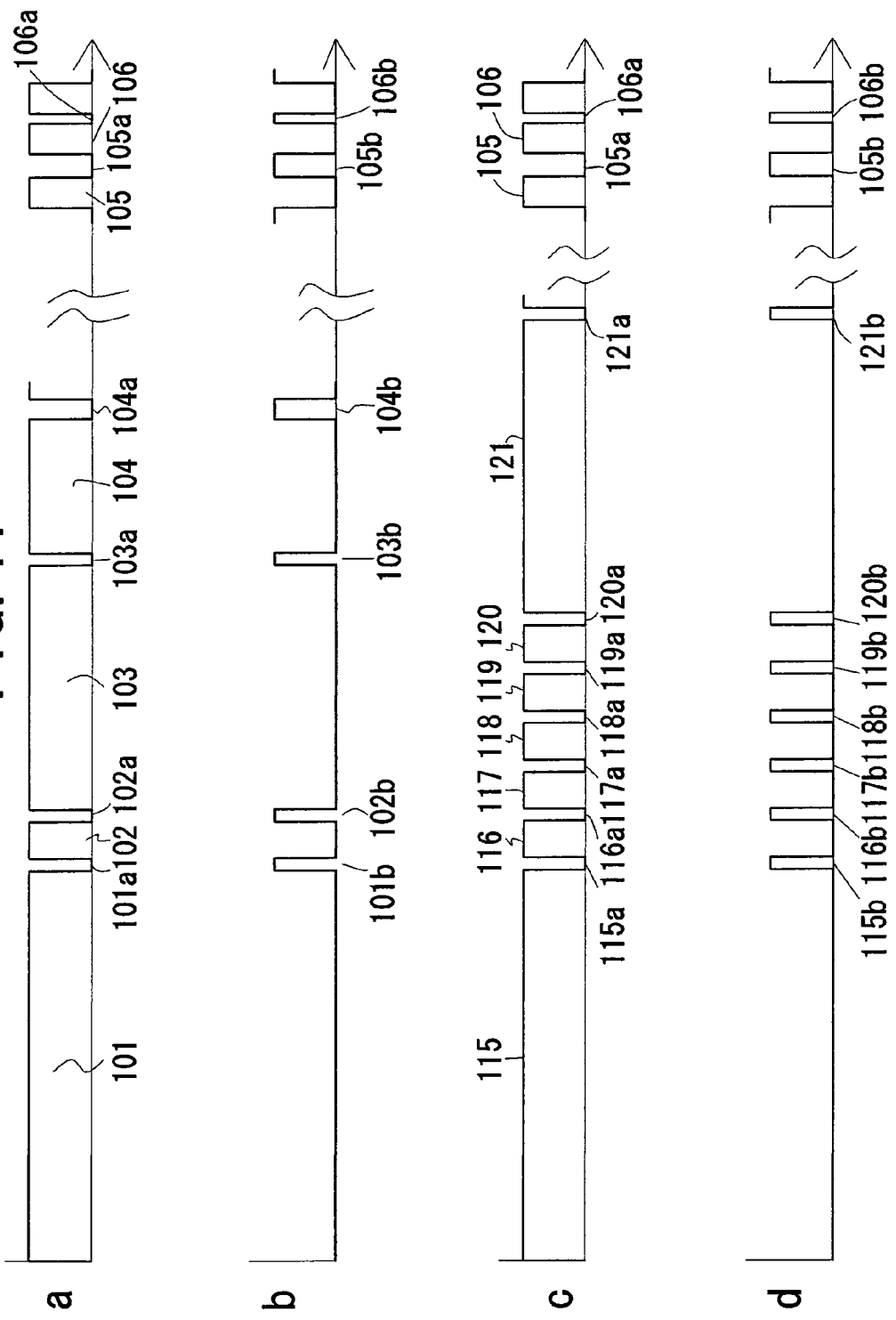

MOTOR DRIVEN ELECTRONIC APPARATUS

TECHNICAL FIELD

The present invention relates to a driving method of a stepping motor, its driving circuit, and a vibration motor and a fan motor employing them.

BACKGROUND TECHNIQUE

At first, structure of a rectangular and thin type vibration motor employing the stepping motor, is explained.

FIG. 8a and FIG. 8b show a top view and a cross section taken on line A-A of FIG. 8a of a rectangular and thin type vibration motor employing the stepping motor used in the present invention, respectively (Similar prior art is disclosed in Patent Reference 4). A vibration motor 80 comprises a two pole flat stator 81 having a rectangle shape base block 87 and a housing 88, a rotor 82 consisting of a permanent magnet 82a locating in a rotor hole 81a provided on the flat stator 81, coupling magnetically with the flat stator 81 through a gap 81b and stopping with detent torque generated by notches 81c and 81d provided in the rotor hole 81a, a drive coil 83 coupling magnetically with the flat stator 81 and consisting of a coil 83b wound on a coil core 83a and a eccentric weight 85 secured to a rotor shaft 82b and functions as the vibration motor, as external power supply is supplied to a driver IC 86 in which a driving circuit is integrated to one chip, with an external power supply terminal (is not shown) which is able to be connected to the external power supply of the vibration motor 80, a bipolar drive current is supplied onto the drive coil 83, the rotor 82 is rotated at a high speed and a vibration is generated by a centrifugal force acting on the eccentric weight 85.

Next, FIG. 9a and FIG. 9b show a top view and a cross section taken on line B-B of FIG. 9a of another rectangular and thin type vibration motor employing the stepping motor used in the present invention, respectively (Similar prior art is disclosed in Patent Reference 4). The different point with the vibration motor 80 shown in FIG. 8a and FIG. 8b, is the point that for a rotor hole 91a of a two pole flat stator 91, not the notches 81c and 81d provided in the rotor hole 81a to generate detent torque, but steps 91c and 91d are provided in the rotor hole 91a. Because the structure except for it is the same with that of FIG. 8a and FIG. 8b, its explanation is omitted.

At first, using FIG. 3a and FIG. 3b that show a rotation chart of a rotor and a non-rotation and vibration chart of the rotor at a start pulse, respectively, the motion of the rotor 82 is explained when the vibration motor 80 shown in FIG. 8a and FIG. 8b is driven by the start pulse. One hand, as shown in the rotation chart of the rotor (FIG. 3a), when the rotor 82 is stopping, N and S of its magnetic poles 82a being along a M-M direction, the bipolar drive current is supplied onto the drive coil 83 from the driver IC 86 by the start pulse, the stator 81 is polarized to N and S along a L-L direction, the rotor 82 passes along 31a of a CW direction and a cross point 31b against the L-L and starts to rotate along 31c, on the other hand, as shown in the non-rotation and vibration chart of the rotor (FIG. 3b), when the rotor is stopping S and N of the magnetic poles 82a being along the M-M direction, the bipolar drive current is supplied onto the drive coil 83 from the driver IC 86 by the start pulse, the stator 81 is polarized to N and S along the L-L direction, and the rotor 82 passes along 32a of a CCW direction and a cross point 32b against the L-L and starts not to rotate but to vibrate along 32c and 32d.

Furthermore, using FIG. 4 that shows a rotation control flow chart from power on until stop, is used, and the rotation control is explained. The rotation control becomes, on hand, as external power supply is supplied to the driver IC 86 (power on 41), start (42), start pulse output (43), goes to rotation detection (44) of the rotor 82, if the rotation of the rotor 82 is detected, goes to a start rotation mode (46), and the rotor 82 continues to rotate until the external power supply is turned off (power off 48), when the external power is turned off (the power off 48), the rotation control will stop (49), and again as the external power supply is supplied (the power on 41), the rotation control returns to start (42), and on the other hand, as at the rotation detection (44), the rotation of the rotor (82) is not detected, if try count is not over n (45), the rotation control returns to the rotation detection (44), if try count is over n (45) (in a drive pulse in a start non-rotation mode indicated in FIG. 1-(c) and FIG. 11-(c) explained hereinafter, n is set up 6, respectively) it goes to the start non-rotation mode (47), the rotor 82 continues to rotate until the external power supply is turned off (the power off 48), and when the external power supply is turned off (the power off 48), the rotation control will stop (49), and again as the external power supply is supplied (the power on 41), the rotation control is getting to the sequence that it returns to start (42).

Next, a conventional driving method and a conventional driving circuit of the vibration motor shown in FIG. 8a, FIG. 8b, FIG. 9a and FIG. 9b are explained (Similar prior arts are disclosed in Patent References 1, 2 and 3), using FIG. 12 that shows a block diagram of a conventional driving circuit, and FIG. 13 that shows a block diagram of a conventional rotor position detector with an operation amplifier, and FIG. 14 that shows a block diagram of a conventional rotor position detector with an inverter, FIG. 10-(a) that indicates a drive pulse, FIG. 10-(b) that indicates a voltage waveform after amplification, in a start rotation mode, FIG. 10-(c) that indicates a drive pulse, and FIG. 10-(d) that indicates a voltage waveform, in a start non-rotation mode and FIG. 11-(a) that indicates a drive pulse, FIG. 11-(b) that indicates an analog switching control signal of a reference voltage circuit for amplifier, in a start rotation mode, FIG. 11-(c) that indicates a drive pulse, and FIG. 11-(d) that indicates an analog switching control signal of a reference voltage circuit for amplifier, in a start non-rotation mode.

As shown in FIG. 12, the conventional driving circuit 220 consists of a rotor position detector 221 connecting to both terminals of a drive coil 226b of a stepping motor 226a shown in FIG. 8a, FIG. 8b, FIG. 9a and FIG. 9b and detecting a position of the rotor, a power on reset circuit 222 which when the external power supply is supplied to the driving circuit 220 connecting to an external power supply (is not shown) through an external power supply terminals 227a and 227b, outputs a motor control signal 222a that turns the motor on and as the external power supply is turned off, outputs the motor control signal 222a that turns the motor off, a reference signal generator 223 inputting the motor control signal 222a from the power on reset circuit 222 and generating a reference signal 223a, a drive pulse generation circuit 224 outputting a drive pulse 225a at timing of a rotor position detection signal 221a outputted by the rotor position detector 221 on the basis of the reference signal 223a from the reference signal generator 223, and as explained in details hereinafter, having a start rotation/non-rotation detecting means 224a and a start rotation/non-rotation mode switching means 224c inputting a start rotation/non-rotation detection signal 224b output by the start rotation/non-rotation detecting means 224a and a driver 225 which supplies a bipolar drive current to a drive coil 226b by the drive pulse 225a.

The rotor position detector 221 consists of a reference voltage circuit 221b for amplifier, an amplifier 221e working on the basis of a reference voltage 221d output by the reference voltage circuit 221b for amplifier, a reference voltage circuit 221h for comparator which outputs a reference voltage 221i that is an intermediate voltage of the external power supply and a comparator 221g outputting a rotor position detection signal 221a to the drive pulse generation circuit 224 by comparing an output 221f of the amplifier 221e with the reference voltage 221i.

As shown in FIG. 13, a conventional rotor position detector 230 using an operational amplifier comprises analog switches SW9 and SW10 connecting to external power supply terminals 238a and 238b and turning on or off by an analog switching control signal 237, resistors R31 and R32 connecting to the analog switches SW9 and SW10 and a reference voltage circuit 232 for amplifier connecting to a junction point 232a of the resistors R31 and R32 and consisting of a voltage follower 232b outputting a reference voltage 232c, an amplifier 233 consisting of an operational amplifier 233a with a feedback resistor R38, working on the basis on an output 232c of a voltage follower 232b through a resistor R36 and connecting to both sides of a drive coil 236 with driver terminals 236a and 236b through the resistors R36 and R37, a reference voltage circuit 235 for comparator connecting to a junction point 235b of resistors R33 and R34 connecting to the external power supply and the ground through external power supply terminals 238a and 238b and consisting of voltage follower 235c outputting a reference voltage 235d of an intermediate voltage between the external power supply and the ground and a comparator 234 inputting an output 233b of the amplifier 233 through a resistor R39, works on the basis of a reference voltage 235d that is output of the reference voltage circuit 235 for comparator through a resistor R40, consisting of a feedback resistor R41, inputting inversely an output 234b from a comparator 234a with hysteresis which is necessary to work exactly when an output 233b of the amplifier 233 gets across the reference voltage 235d and is product of ratio of the resistor R40 and a feedback resistor R41, and the external power supply value (Vcc) and consisting of an inverter 234c outputting a rotor position detection signal 234d.

As shown in FIG. 14, a conventional rotor position detector 240 using an inverter comprises analog switches SW11 and SW12 connecting with external power supply terminal 247a and ground terminal 247b and turning on or off by an analog switching control signal 246, a reference voltage circuit 242 for amplifier consisting of resistors R51 and R52 connecting to analog switches SW11 and SW12 and connecting a junction point 242a of resistors R51 and R52 to the other terminal of a drive coil 245 with driver connection terminals 245a and 245b, an amplifier 243 connecting to the other terminal of the drive coil 245 through a resistor R53 and consisting of an inverter 243a with a feedback resistor R54, a comparator 244 consisting of inverters 244a and 244b inputting an output 243b of the amplifier 243 through a resistor R55, outputting a rotor position detection signal 244c, having a feedback resistor R56 and having the hysteresis which is necessary to work exactly when the output 243b of the amplifier 243 gets across a reference voltage (threshold) that is comparable with a reference voltage 235d of a reference voltage circuit 235 for comparator of the conventional rotor position detector 230 using an operational amplifier as shown in FIG. 13 and is product of, ratio of the resistor R55 and a feedback resistor R56, and the external power supply value (Vcc).

A conventional driving method is explained, using FIG. 10-(a) that indicates a drive pulse, FIG. 10-(b) that indicates a voltage waveform after an amplification, in a start rotation mode, FIG. 10-(c) that indicates a drive pulse, and FIG. 10-(d) that indicates a voltage waveform after amplification, in a start non-rotation mode, and FIG. 11-(a) that indicates a drive pulse, FIG. 11-(b) that indicates an analog switching control signal of a reference voltage circuit for amplification in a start rotation mode, FIG. 11-(c) that indicates a drive pulse, and FIG. 11-(d) that indicates an analog switching control signal of a reference voltage circuit of amplification, in a start non-rotation mode. Still, in the explanation, the stepping motor 80 shown in FIG. 8a and FIG. 8b, and a block diagram of a conventional rotor position detector using an operational amplifier in shown FIG. 13, are used, it is similar for the stepping motor 90 shown in FIG. 9a and FIG. 9b and a block diagram of a conventional rotor position detector using an inverter in shown FIG. 14.

To start the stepping motor 80, at first, a start pulse 101 with a chopper pulse 102 is output from the drive pulse generation circuit 224 shown in FIG. 12, by an analog switching control signal 101b that is an inverted non-pulse interval 101a of the chopper pulse, analog switches SW9 and SW10 of a reference voltage circuit 232 for amplifier shown in FIG. 13 are turned on, and a reference voltage 232c set up resistance division of the external power supply voltage according to resistances of R31 and R32, as an output of a voltage follower 233b becomes a reference voltage 114 of an operational amplifier 233a shown in FIG. 10, the reference voltage 114 is set up higher than an upper threshold voltage 113a of a reference voltage 113 that is an output 235d of a reference voltage circuit 235 for comparator, and in a timing diagram of a voltage waveform after amplification in a start rotation mode indicated in FIG. 10-(b), a counter electromotive voltage 107b of the rotor 82, indicated as a broken line, in the start rotation mode at the start pulse 101 gets over an upper threshold voltage 113a at a non-pulse interval 101a just before a chopper pulse 102, and at the non-pulse interval 101a, it is not detected that the rotor 82 has started to rotate, and at the next non-pulse interval 102a, a counter electromotive voltage 107b gets down from the upper threshold voltage 113a, and start rotation/non-rotation detecting means 224a which a drive pulse generation circuit 224 has detects the rotation of the rotor 82 through a rotor position detection signal 221a that a comparator 221g outputs, start rotation/non-rotation mode switching means 224c inputs a start rotation signal 224b which the start rotation/non-rotation detecting means 224a outputs, and then it goes to the start rotation mode, next drive pulse 103 in the start rotation mode is output by the drive pulse generation circuit 224, and the vibration motor 80 starts smoothly, on the other hand, in the voltage waveform after amplification in the start non-rotation mode indicated in FIG. 10-(d), as a counter electromotive voltage 124b in start non-rotation and vibration of the rotor 82 at a start pulse 115, indicated as a broken line, at non-pulse intervals 115a, 116a, 117a, 118a, 119a and 120a of chopper pulses 116, 117, 118, 119 and 120 gets over the upper threshold voltage 113a, the start rotation/non-rotation detecting means 224a which the drive pulse generation circuit 224 has, detects the start non-rotation and vibration of the rotor 82 through the rotor position detection signal 221a which the comparator 221g outputs, the start rotation/non-rotation mode switching means 224c inputs the start non-rotation signal 224b which the start rotation/non-rotation detecting means 224a outputs, and it goes to the start non-rotation mode, and the drive pulse generation circuit 224 in the start non-rotation mode outputs next wider drive pulse 121 than next drive pulse 103 of the start pulse 101 of the start rotation mode just after a non-pulse interval 120a, and the vibration motor 80 starts smoothly.

Patent Reference 1: Japanese Patent No. 3258125
Patent Reference 2: Japanese Patent No. 3645908
Patent Reference 3: Japanese Patent No. 3808510
Patent Reference 4: Unexamined Japanese Patent Publication No. 2007-104796

DISCLOSURE OF THE INVENTION

Problems to be Solved by the Invention

As indicated in FIG. 10-(b) and FIG. 10-(d), whether, at the start pulse, the rotor has started to rotate or the rotor has started not to rotate but to vibrate is able to be detected, next respectively it goes to the drive pulse of the start rotation mode or the start non-rotation mode and the motor can start, but because the reference voltage 114 working as the reference of the amplifier 233 is set up higher than the upper threshold voltage 113a of the reference voltage 113 of the comparator 234, as indicated in FIG. 10-(a) and FIG. 10-(b), at a high speed rotation, the non-negligible difference occurs between the time interval 105a which it takes for the counter electromotive voltage 111b to get across lower threshold voltage 113b after the drive pulse 105 and the time interval 106a which it takes for the counter electromotive voltage 112b to get across upper the threshold voltage 113a after the drive pulse 106 whose pulse width is equal to that of the drive pulse 105, and the motor can not be driven efficiently and the problem that the rotor was not able to rotate until a sufficient high speed, existed. The similar problem existed in a high-speed rotation indicated in FIG. 10-(c) and FIG. 10-(d).

On the other hand, in order to make the time interval 105a almost equal to the time interval 106a at the high speed rotation, if the reference voltage 114 working as the reference of the amplifier 233 is not set up higher than the upper voltage 113a of the reference voltage 113 of the comparator 234 (is not shown), it occurs that the counter electromotive voltage doesn't get over the upper threshold voltage 113a at the non-pulse interval 115a just before the chopper pulse 116 when the rotor starts not to rotate but to vibrate at the start pulse 115, and it gets detected that the rotor has started not to rotate but to vibrate, however the rotor has started to rotate, it should to be a drive of the start non-rotation mode after the start pulse 115, but it gets the drive of the start rotation mode, and just after start pulse 115 as the drive pulse doesn't become the drive pulse 121 but the drive pulse 103 whose pulse width is narrower than that of the drive pulse 121 in the start rotation mode, it occurred that load of one side weight of the eccentric weight 85 in a case of position of the vibration motor 80 increased, the drive force got insufficient and the rotor 82 did not start.

By the way, it is necessary to improve motor performance so as to miniaturize the vibration motor 80, then the gap 81a between the permanent magnet 82a of the rotor 82 and the yoke 81 is made smaller, so that the magnetic coupling between the permanent magnet 82a of the rotor 82 and the yoke 81 is made stronger, as explained in details in the embodiment, in a timing diagram of a voltage waveform after amplification indicated in FIG. 19-(d), the counter electromotive voltage 30b in the start non-rotation mode changes more largely than the counter electromotive voltage 124b in the start non-rotation mode indicated in FIG. 10-(d) and though it should to be the drive of the start non-rotation mode, more frequently, it gets the incorrect rotation mode that has got the drive of the start rotation mode and it became the problem against miniaturization.

Means for Solving the Problems

A motor driven electronic apparatus comprises a stepping motor consisting of a two pole flat stator, a rotor consisting of a two pole permanent magnet coupling magnetically with the two pole flat stator through a gap, stopping with detent torque and secured to the rotor shaft, and a drive coil, and
an amplifier constituting a rotor position detector and amplifying a counter electromotive voltage generated on the drive coil by motion of the rotor on the basis of a reference voltage for amplifier,
a comparator constituting the rotor position detector, detecting a rotor position from an output of the amplifier and having hysteresis consisting of an upper threshold voltage and a lower threshold voltage on the basis of a reference voltage for comparator outputted by a reference voltage circuit for comparator, furthermore
a drive pulse generation circuit generating a drive pulse at timing of the rotor position, and
a driver supplying a bipolar drive current corresponding to the drive pulse onto the drive coil and driving the stepping motor, wherein
at least any one of the reference voltage for amplifier and the reference voltage for comparator are used more than one.

The reference voltage for amplifier is used more than one and the reference voltage for comparator is used one, or the former is used one and the latter is used more than one.

The reference voltage for amplifier is used two and the reference voltage for comparator is used one, the reference voltage for amplifier is made able to be set up either a first reference voltage for amplifier which is larger than the upper threshold voltage or is smaller than the lower threshold voltage, on the basis of the reference voltage of the comparator, or a second reference voltage for amplifier whose absolute value of the difference of voltage is smaller than that of the first reference voltage for amplifier, from the reference voltage for comparator, and is set up the first reference voltage for amplifier only at the start pulse with chopper pulses, and furthermore the direction of the drive current supplied onto the drive coil at the start pulse is fixed to any one of sides of bipolarity, corresponding to whether the first reference voltage for amplifier is larger than the upper threshold voltage, or is smaller than the lower threshold voltage, on the basis of the reference voltage of the comparator.

The difference of voltage between the first reference voltage for amplifier, and the upper threshold voltage or the lower threshold voltage on the basis of the reference voltage of the comparator, is set up on the basis that whether, at the start pulse, the rotor has started (Has a start rotation mode started?) or the rotor has started not to rotate but to vibrate (Has a start non-rotation mode started?) is judged exactly and the rotor can start.

The difference of voltage between the second reference voltage for amplifier and the reference voltage for comparator is set up on the basis that a time interval between drive pulses adjacent each other whose pulse width is equal, is made equal at a high speed rotation of the stepping motor.

The reference voltage for amplifier is used one and the reference voltage for comparator is used two, the reference voltage for comparator is made able to be set up either the first reference voltage for comparator whose upper threshold voltage is smaller or lower threshold voltage is larger than the reference voltage for amplifier, on the basis of the first reference voltage of the comparator, or the second reference voltage for comparator whose absolute value of the difference of voltage is smaller than that of the first reference voltage for comparator, from the reference voltage for amplifier, and is set up the first reference voltage for comparator only at the start pulse with chopper pulses, and furthermore the direction of the drive current supplied onto the drive coil at the start pulse, is fixed to any one of sides of bipolarity, corresponding to whether the reference voltage for amplifier is larger than the upper threshold voltage, or is smaller than the lower threshold voltage, on the basis of the first reference voltage of the comparator.

The difference of voltage between the reference voltage for amplifier, and the upper threshold voltage or the lower threshold voltage on the basis of the first reference voltage of the comparator, is set up on the basis that whether, at the start pulse, the rotor has started (Has the start rotation mode started?) or the rotor has started not to rotate but to vibrate (Has the start non-rotation mode started?) is judged exactly and the rotor can start.

The difference of voltage between the reference voltage for amplifier and the second reference voltage for comparator is set up on the basis that the time interval between the drive pulses adjacent each other whose pulse width is equal, is made equal at a high speed rotation of the stepping motor.

A driving circuit of the stepping motor which drives the stepping motor consisting of the two pole flat stator, the rotor consisting of the two pole permanent magnet coupling magnetically with the two pole flat stator through the gap, stopping with detent torque and secured to the rotor shaft, and the drive coil, comprises the rotor position detector consisting of the amplifier which amplifies the counter electromotive voltage generated on the drive coil by motion of the rotor, the reference voltage circuit for comparator outputting the reference voltage for comparator and the comparator having the hysteresis consisting of the upper threshold voltage and the lower threshold voltage on the basis of the reference voltage for comparator and detecting the rotor position through the output of the amplifier, the drive pulse generation circuit generating the drive pulse at timing of the rotor position, the driver supplying the bipolar drive current corresponding to the drive pulse onto the drive coil, wherein a reference voltage input terminal of the amplifier, only at the start pulse with the chopper pulses, is connected to the first reference voltage circuit for amplifier constituting the rotor position detector and outputting the first reference voltage for amplifier that is larger than the upper threshold voltage or smaller than the lower threshold voltage, on the basis of the reference voltage of the comparator, and furthermore except for the start pulse with the chopper pulses, is connected to the second reference voltage circuit for amplifier constituting the rotor position detector and outputting the second reference voltage for amplifier whose absolute value of the difference of voltage is smaller than that of the first reference voltage for amplifier, from the reference voltage for comparator.

A driving circuit of the stepping motor which drive the stepping motor consisting of the two pole flat stator, the rotor consisting of the two pole permanent magnet coupling magnetically with the two pole flat stator through the gap, stopping with detent torque and secured to the rotor shaft, and the drive coil, comprises the rotor position detector consisting of the reference voltage circuit for amplifier outputting the reference voltage for amplifier, the amplifier which amplifies the counter electromotive voltage generated on the drive coil by motion of the rotor, the reference voltage circuit for comparator outputting the reference voltage for comparator and the comparator having the hysteresis consisting of the upper threshold voltage and the lower threshold voltage on the basis of reference voltage for comparator and detecting the rotor position through the output of the amplifier, the drive pulse generation circuit generating the drive pulse at timing of the rotor position, the driver supplying the bipolar drive current corresponding to the drive pulse onto the drive coil, wherein a reference voltage input terminal of the comparator, only at the start pulse with the chopper pulses, is connected to the first reference voltage circuit for comparator constituting the rotor position detector, outputting the first reference voltage for comparator whose upper threshold voltage is smaller or lower threshold voltage is larger, on the basis of the first reference voltage of the comparator, than the reference voltage for amplifier which the reference voltage circuit for amplifier outputs, and furthermore, except for the start pulse with the chopper pulses, is connected to the second reference voltage circuit for comparator constituting the rotor position detector and outputting the second reference voltage for comparator whose absolute value of the difference of voltage is smaller than that of the first reference voltage for comparator, from the reference voltage for amplifier The reference voltage for amplifier is used n of more than one, consisting of the first reference voltage for amplifier and a m-th reference voltage for amplifier (m=2 to n) and the reference voltage for comparator is used n of more than one, consisting of the first reference voltage for comparator which makes a pair with the first reference voltage for amplifier and a m-th reference voltage for comparator (m=2 to n) which makes a pair with the m-th reference voltage for amplifier.

The reference voltage for amplifier is made able to be set up any one of the first reference voltage for amplifier which is larger than the upper threshold voltage or a power supply voltage, or is smaller than the lower threshold voltage or a power supply ground on the basis of the first reference voltage of the comparator, and the m-th reference voltage for amplifier whose absolute value of the difference of voltage from the m-th reference voltage for comparator is smaller than that between the first reference voltage for amplifier and the first reference voltage for comparator, similarly the reference voltage for comparator is made able to be set up any one of the first reference voltage for comparator and the m-th reference voltage for comparator, they are set up the first reference voltage for amplifier and the first reference voltage for comparator only at the start pulse with chopper pulses respectively, and except for the start pulse with chopper pulses are set up the m-th reference voltage for amplifier and the m-th reference voltage for comparator respectively, and furthermore the direction of the drive current which is supplied onto the drive coil at the start pulse is fixed to any one of sides of bipolarity, corresponding to whether the first reference voltage for amplifier is larger than the upper threshold voltage or is smaller than the lower threshold voltage on the basis of the first reference voltage of the comparator.

The difference of voltage between the first reference voltage for amplifier and the upper threshold voltage or the lower threshold voltage on the basis of the first reference voltage of the comparator, is set up on the basis that whether, at the start pulse, the rotor has started (Has the start rotation mode started?) or the rotor has started not to rotate but to vibrate (Has the start non-rotation mode started?) is judged exactly and the rotor can start.

The difference of voltage between the nth reference voltage for amplifier and the nth reference voltage for comparator is set up on the basis that the time interval between the drive pulses adjacent each other whose pulse width is equal, is made equal at a high speed rotation of the stepping motor.

The difference of voltage between the first reference voltage for amplifier, and the upper threshold voltage or the lower threshold voltage on the basis of the first reference voltage of the comparator, is made larger than ½ voltage of the power supply.

n=2.

A driving circuit of the stepping motor which drives the stepping motor consisting of the two pole flat stator, the rotor consisting of the two pole permanent magnet coupling magnetically with the two pole flat stator through the gap, stopping with detent torque and secured to the rotor shaft, and the drive coil, comprises an amplifier which amplifies the counter electromotive voltage generated on the drive coil by motion of the rotor on the basis of the reference voltage for amplifier which the reference voltage circuit for amplifier outputs;

a reference voltage circuit for comparator which outputs the reference voltage for comparator, a rotor position detector consisting of a comparator having the hysteresis consisting of the upper threshold voltage and the lower threshold voltage on the basis of the reference voltage for comparator and detecting the rotor position through the output of the amplifier, a drive pulse generation circuit generating the drive pulse at timing of the rotor position, and a driver supplying the bipolar drive current corresponding to the drive pulse onto the drive coil, wherein a reference voltage input terminal of the amplifier, only at the start pulse with the chopper pulses, is connected to the first reference voltage circuit for amplifier constituting the rotor position detector, outputting the first reference voltage for amplifier that is larger than the upper threshold voltage or the power supply voltage, or smaller than the lower threshold voltage or the power supply ground, and a reference voltage input terminal of the comparator is connected to the first reference voltage circuit for comparator outputting the first reference voltage for comparator, and furthermore except for the start pulse with the chopper pulses, the reference voltage input terminal of the amplifier is connected to the m-th reference voltage circuit for amplifier constituting the rotor position detector, outputting the m-th reference voltage for amplifier (m=2–n) whose difference of voltage from the m-th reference voltage for comparator (m=2–n) is smaller than that of between the first reference voltage for amplifier and the first reference voltage for comparator, and the reference voltage input terminal for the comparator is connected to the m-th reference voltage circuit for comparator outputting the m-th reference voltage for comparator, and furthermore the drive pulse generation circuit fixes the direction of the drive current supplied onto the drive coil by the start pulse to any one of sides of bipolarity, corresponding to whether the first reference voltage for amplifier is larger than the upper threshold voltage or smaller than lower threshold voltage on the basis of the first reference voltage of the comparator.

n=2.

The stepping motor is a vibration motor with a driver IC in which the driving circuit is integrated to one chip, and a rotational weight.

The rotational weight has a shape of a half disc and its front part on at least the direction of rotation in a side part except for a cylindrical part has a shape of streamline.

The stepping motor is a fan motor with the driver IC in which the driving circuit is integrated to one chip, and a fan.

EFFECTS OF THE INVENTION

The present invention has the effect that it can give the vibration motor starting performance and high speed performance when the vibration motor employing a brushless and low consumption stepping motor is used, the external power supply connecting to the driving circuit being turned on and off frequently.

BRIEF DESCRIPTION OF THE DRAWINGS

FIG. 1 shows a timing diagram in a start rotation/non-rotation mode of a first embodiment of the present invention.

FIG. 2 shows a timing diagram in a start rotation/non-rotation mode of the first embodiment of the present invention.

FIG. 10 shows a conventional timing diagram in a start rotation/non-rotation mode.

FIG. 11 shows a conventional timing diagram in a start rotation/non-rotation mode.

Figure 3A:
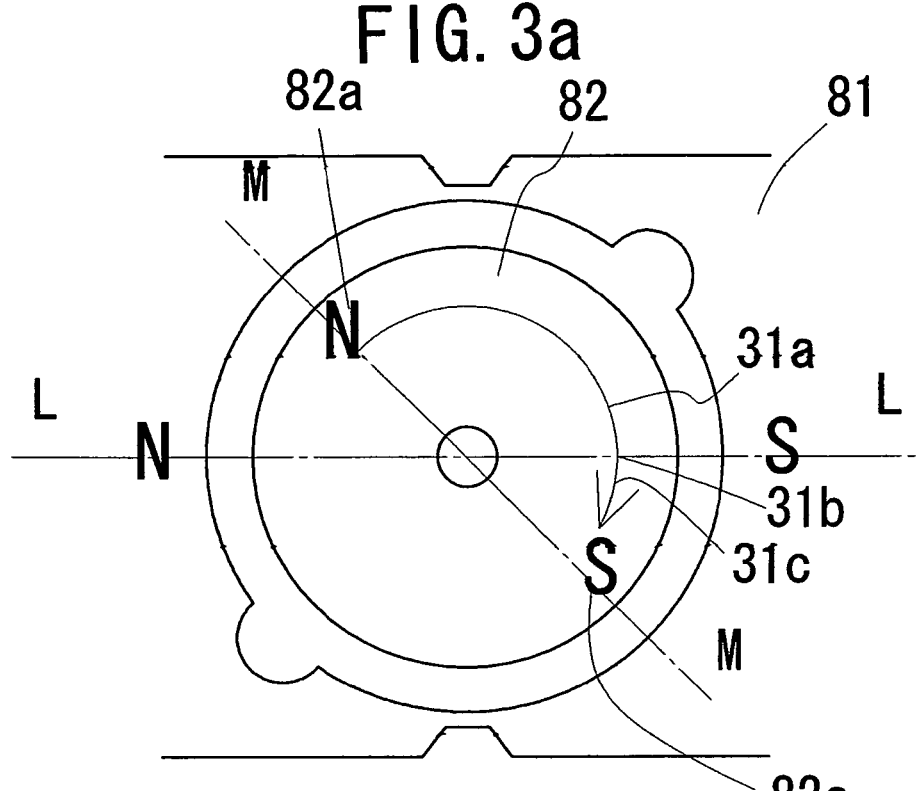
FIG. 3a and FIG. 3b show a rotation chart of a rotor, and a non-rotation and vibration chart of the rotor at a start pulse, respectively.
Figure 3B:
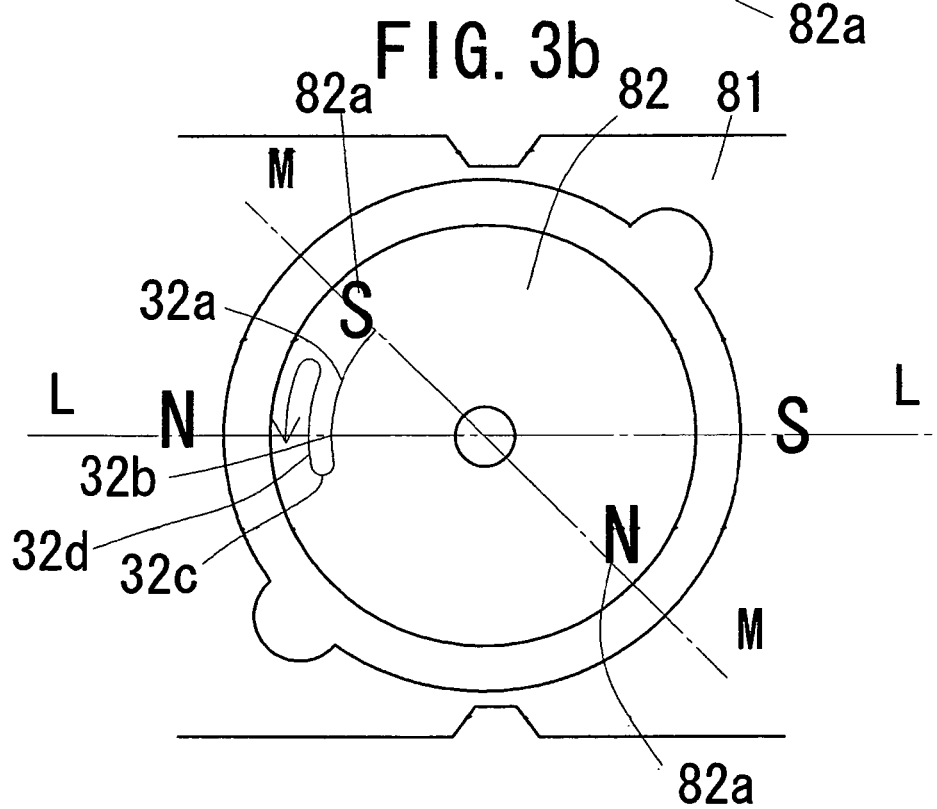
Figure 4:
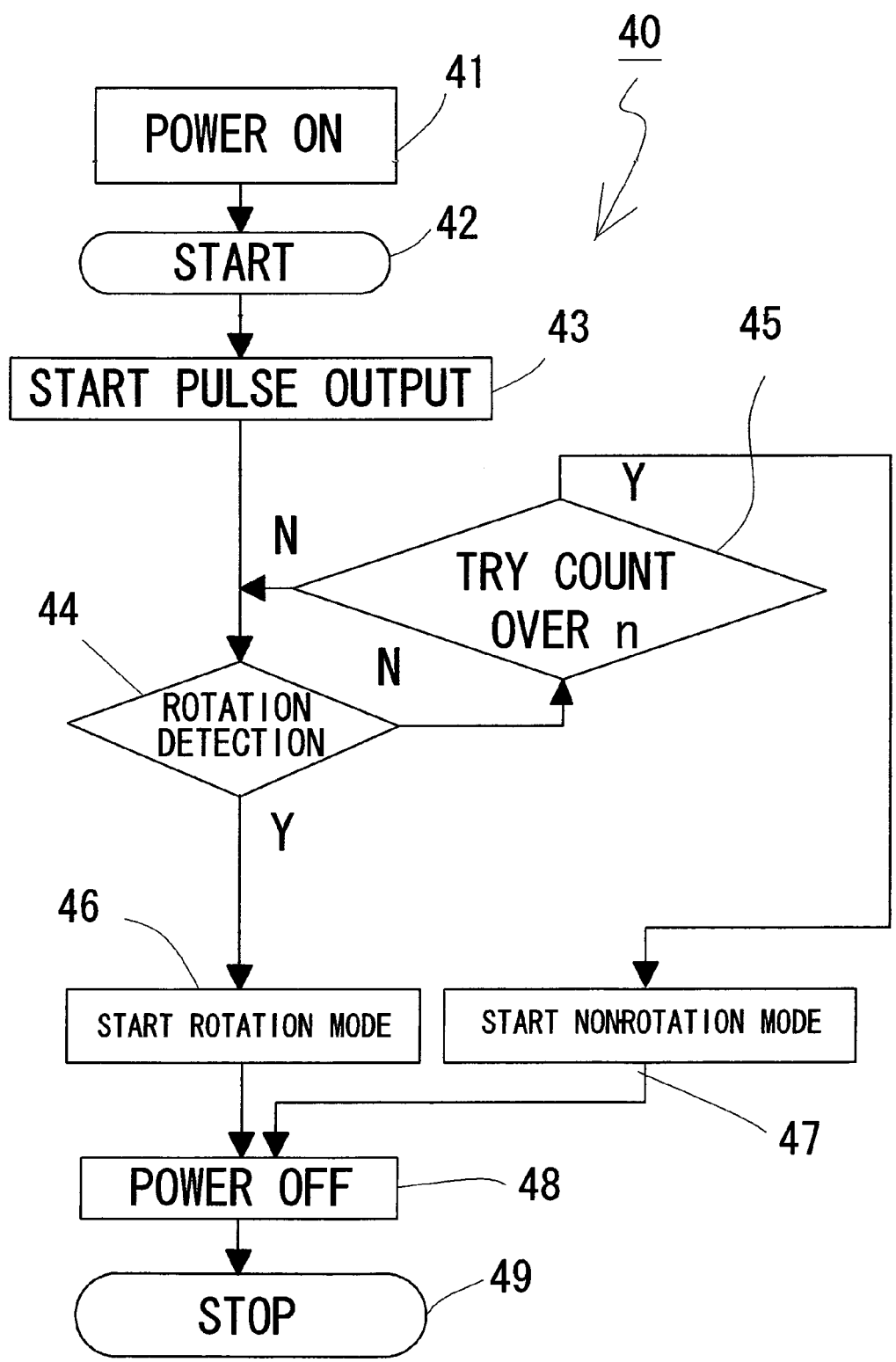
FIG. 4 shows a rotation control flow chart from power on until stop.

1, 15, 101, 115, 1', 22' start pulse
2, 16, 17, 18, 19, 20, 102, 116, 117, 118, 119, 120, 23', 24',25',26',27' chopper pulse
3, 21, 103, 121, 2', 28' drive pulse just after start pulse
5, 6, 105, 106, 8', 9' drive pulse when the rotor rotates at a high speed
1a, 2a, 15a, 16a, 17a, 18a, 19a, 20a, 101a, 102a, 115a, 116a, 117a, 118a, 119a, 120a, 1a', 22a, 23a, 24a', 25a', 26a', 27a' non-pulse interval of chopper pulse
1b, 1d, 1e, 2b, 3b, 4b, 5b, 6b, 15b, 16b, 17b, 18b, 19b, 20b, 21b, 22b, 23b, 67a, 67b, 76a, 76b, 101b, 102b, 103b, 104b, 105b, 106b, 115b, 116b, 117b, 118b, 119b, 120b, 121b, 237, 246, 367a, 367b, 367c, 1b', 1d, 1e, 2c, 3c, 4c, 5c, 6c, 7c, 8c, 9c, 22b, 23b, 24b, 25b, 26b, 27b, 28c, 22d, 22e analog switching control signal
46 start rotation mode
47 start non-rotation mode
14a, 51f, 21a, 51f', 61b first reference voltage for amplifier
14b, 51g, 21b, 51g', 62b second reference voltage for amplifier
114, 221d, 232c, 365d reference voltage for amplifier
313, 351f, 19', 361b first reference voltage for comparator
413, 351g, 20', 362b second reference voltage for comparator
13, 113, 51k, 65d, 221i, 235d reference voltage for comparator
13a, 113a, 313a, 413a, 19a', 20a' upper threshold voltage
13b, 113b, 313b, 413b, 19b', 20b' lower threshold voltage
7b, 24b, 107b, 124b, 10b', 30b, 307b, 324b counter electromotive voltage at a start pulse
51b, 61, 71, 51b', 61' first reference voltage circuit for amplifier
51c, 62, 72, 51c', 627 second reference voltage circuit for amplifier
221b, 232, 242, 351j, 365 reference voltage circuit for amplifier
351b, 361, 51j', 65' first reference voltage circuit for comparator
351c, 362, 51k', 66' second reference voltage circuit for comparator
51j, 65, 221h, 235 reference voltage circuit for comparator
57a, 57b, 68a, 68b, 77a, 77b, 227a, 227b, 238a, 238b, 247a, 247b external power supply terminal

BEST MODE FOR CARRYING OUT THE INVENTION

Hereunder, detailed description will be made about embodiments of the present invention with reference to the drawings.

First Embodiment

Figure 5:
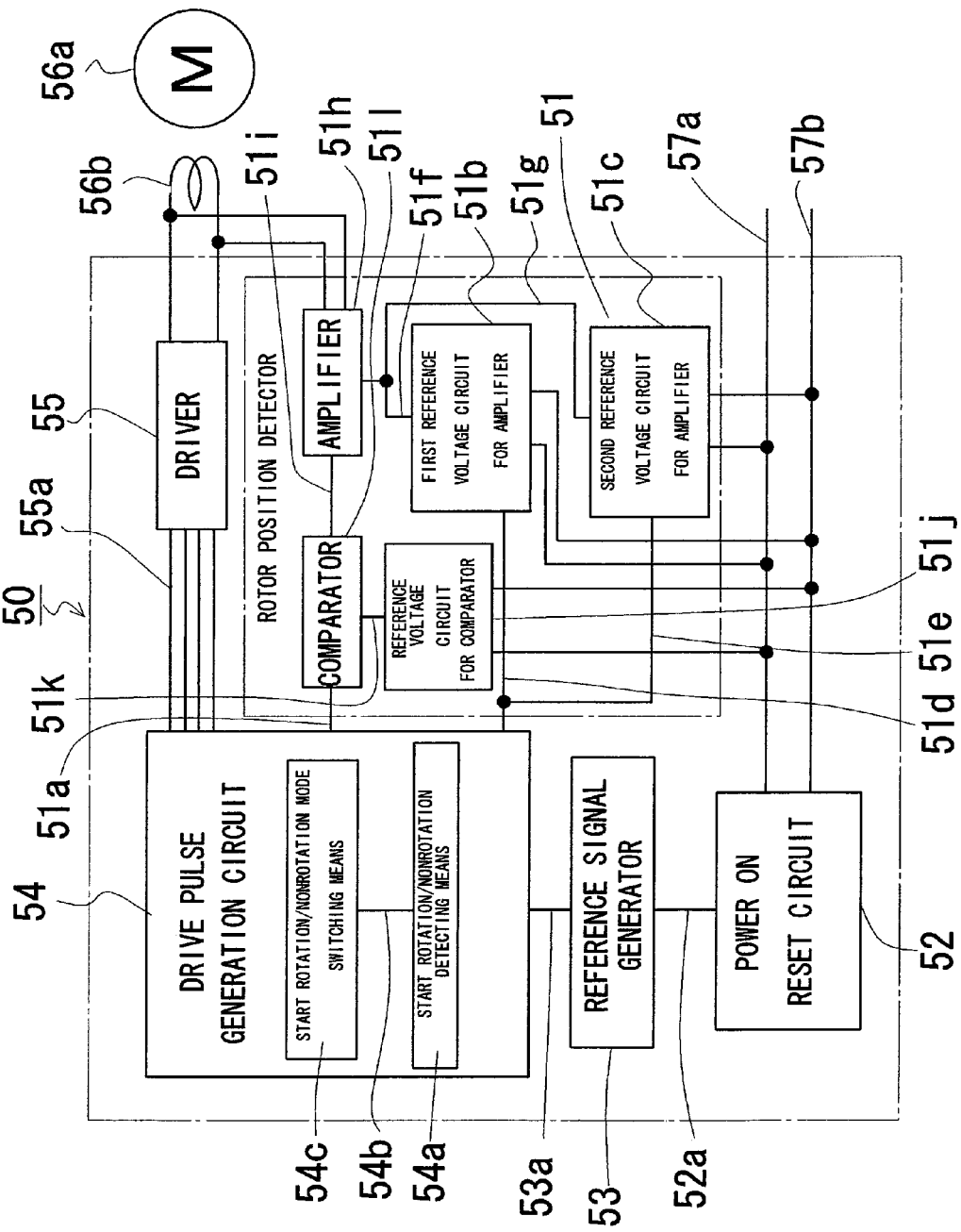
FIG. 5 shows a block diagram of a driving circuit of the first embodiment of the present invention.
Figure 6:
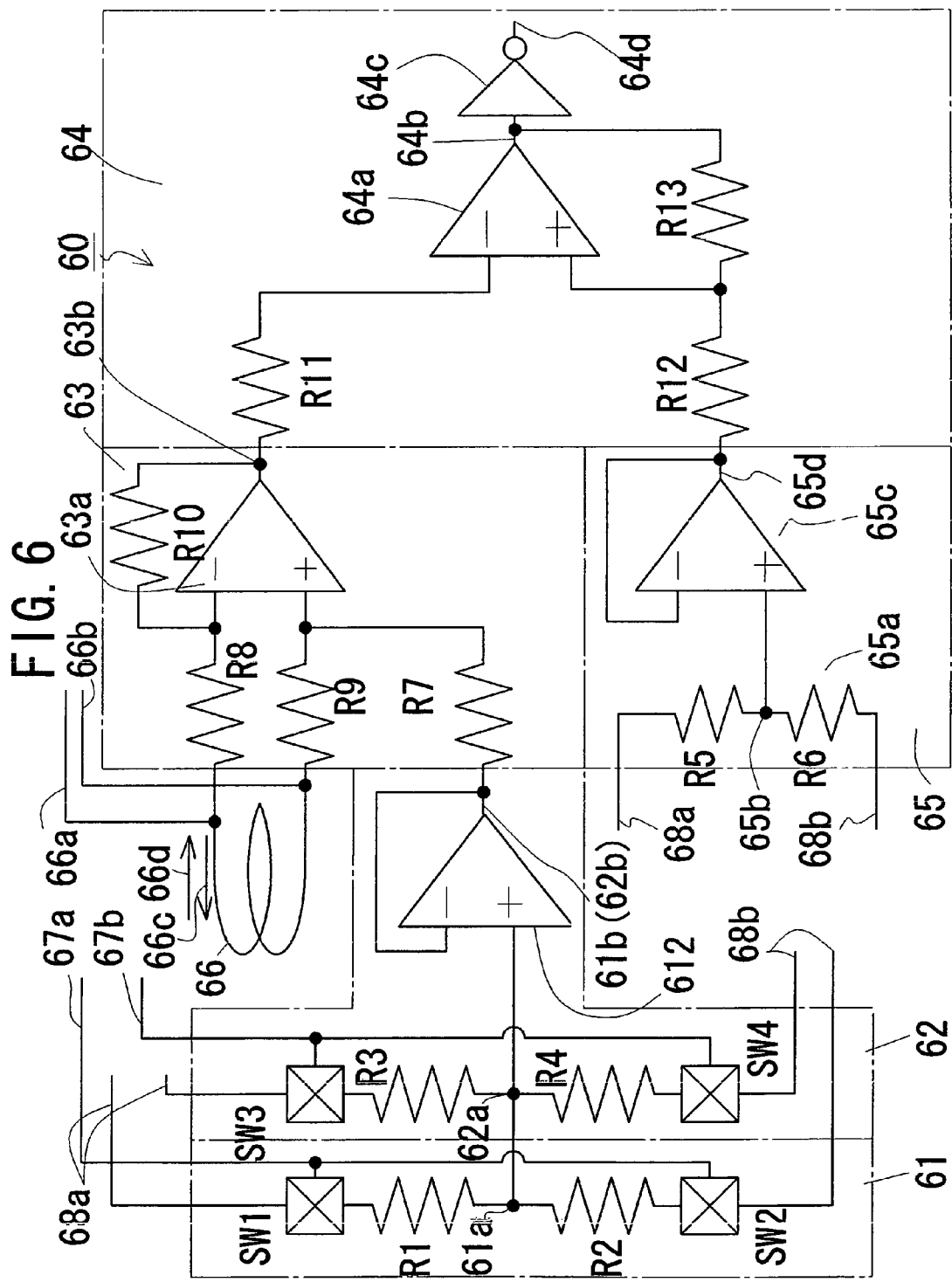
FIG. 6 shows a block diagram of a rotor position detector with an operational amplifier of the first embodiment of the present invention.
Figure 7:
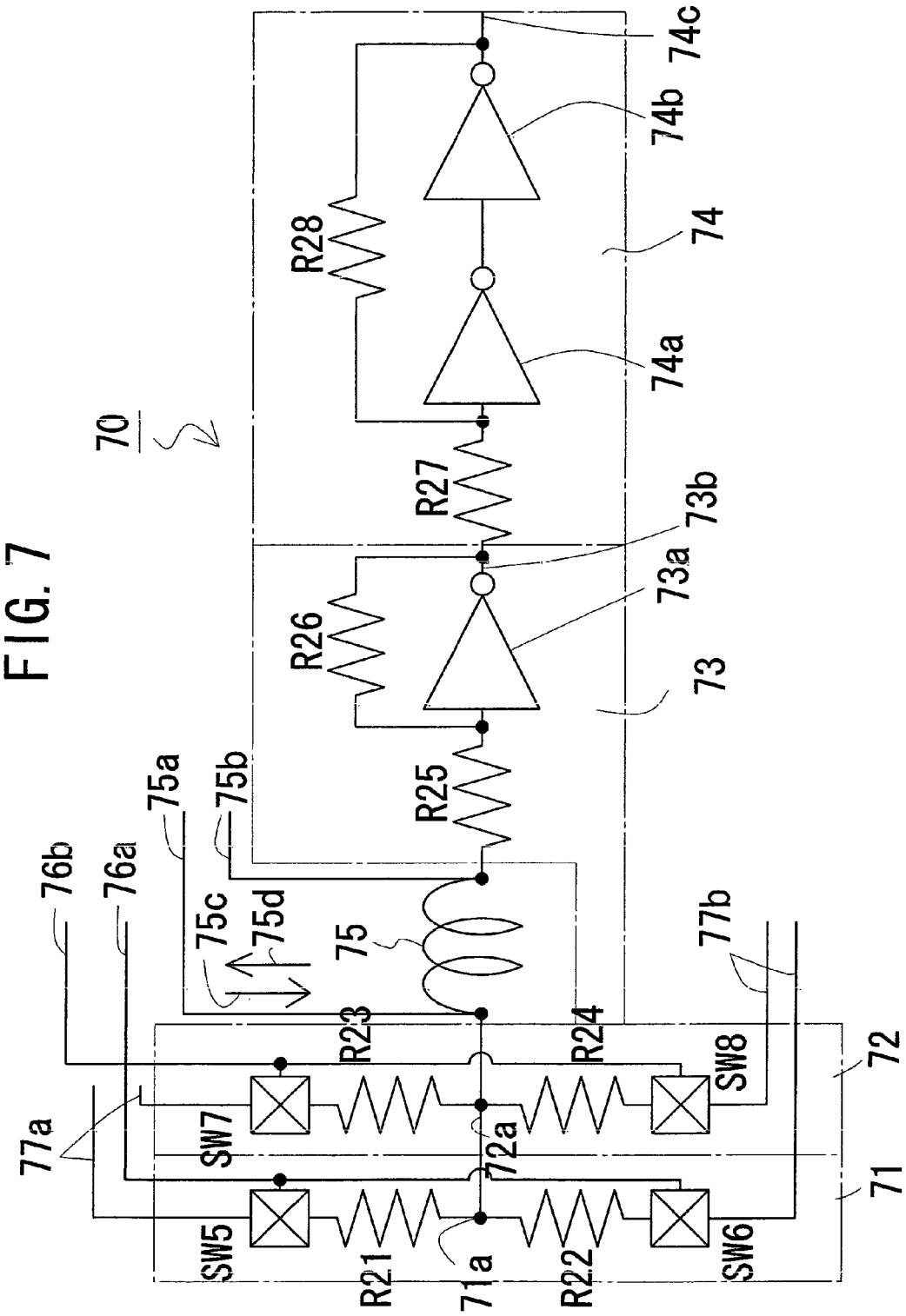
FIG. 7 shows a block diagram of a rotor position detector with an inverter of the first embodiment of the present invention.

Next, the driving method and the driving circuit of the present invention for the vibration motor shown in FIG. 8a and FIG. 8b, or FIG. 9 and FIG. 9b, are explained by using FIG. 5 that shows a block diagram of a driving circuit of the first embodiment of the present invention, FIG. 6 that shows a block diagram of a rotor position detector with an operational amplifier of the first embodiment of the present invention which constitutes the driving circuit of the first embodiment of the present invention, FIG. 7 that shows a block diagram of a rotor position detector with inverters of the first embodiment of the present invention which constitutes the driving circuit of the first embodiment of the present invention, FIG. 1-(a) that indicates a drive pulse, FIG. 1-(b) that indicates a voltage waveform after amplification, in a start rotation mode, FIG. 1-(c) that indicates the drive pulse, FIG. 1-(d) that indicates the voltage waveform after amplification, in a start non-rotation mode, of a first embodiment of the present invention, FIG. 2-(a) that indicates the drive pulse, FIG. 2-(b) that indicates an analog switching control signal of a first reference voltage circuit for amplifier, FIG. 2-(c) that indicates the analog switching control signal of a second reference voltage circuit for amplifier, in the start rotation mode, FIG. 2-(d) that indicates the drive pulse, FIG. 2-(e) that indicates the analog switching control signal of the first reference voltage circuit for amplifier and FIG. 2-(f) that indicates the analog switching control signal of the second reference voltage circuit for amplifier, in the start non-rotation mode, of the first embodiment of the present invention.

As shown in FIG. 5, a driving circuit 50 of the present invention comprises a rotor position detector 51 connecting to both terminals of a drive coil 56b of the stepping motor 56a shown in FIG. 8a, FIG. 8b, FIG. 9a and FIG. 9b, detecting a rotor position, a power on reset circuit 52 connecting to the external power supply terminals 57a and 57b, outputting a motor control signal 52a turning the motor on as soon as the external power supply is supplied and outputting a motor control signal 52a turning the motor off as soon as the external power supply is shut down, a reference signal generator 53 inputting the motor control signal 52a from the power on reset circuit 52 and generating the reference signal 53a, a drive pulse generation circuit 54 outputting a drive pulse 55a at timing of a rotor position signal 51a that the rotor position detector 51 outputs, on the basis of the reference signal 53a from the reference signal generator 53 and having start rotation/non-rotation detecting means 54a, explained in details hereinafter and start rotation/non-rotation mode switching means 54c inputting a start rotation/non-rotation detection signal 54b output by the start rotation/non-rotation detecting means 54a, and a driver 55 which supplies a bipolar drive current onto a drive coil 56b by the drive pulse 55a.

The rotor position detector 51 comprises the first reference voltage circuit 51b for amplifier, the second reference voltage circuit 51c for amplifier, an amplifier 51h working on the basis of the first reference voltage 51f for amplifier which the first reference voltage circuit 51b for amplifier outputs and the second reference voltage 51g for amplifier which the second reference voltage circuit 51c for amplifier outputs, and a comparator 51l outputting a rotor position detector signal 51a to the drive pulse generation circuit 54 comparing an output 51i of the amplifier 51h on the basis of a reference voltage 51k of intermediate voltage of the external power supply which a reference voltage circuit 51j for comparator outputs.

As shown in FIG. 6 that shows a block diagram of a rotor position detector with an operational amplifier, of the first embodiment of the present invention, a rotor position detector 60 consisting of the operational amplifier comprises the first reference voltage circuit 61 for amplifier connecting to external power supply terminals 68a and 68b, consisting of analog switches SW1 and SW2 that are turned on or off by an analog switching control signal 67a and resistors R1 and R2 connecting to the analog switches SW1 and SW2, and outputting the first reference voltage 61b for amplifier, through a voltage follower 612 whose input terminal is connected to a junction point 61a of resistors R1 and R2, and similarly the second reference voltage circuit 62 for amplifier consisting of analog switches SW3 and SW4 that are turned on or off by an analog switching control signal 67b and resistors R3 and R4 connecting to the analog switches SW3 and SW4, and outputting the first reference voltage 62b for amplifier, through the voltage follower 612 whose input terminal is connected to a junction point 62a of resistors R3 and R4, an amplifier 63 consisting of an operational 63a consisting of a feed back resistor R10, working on the basis of outputs of 61b or 62b of the voltage follower 612 through R7, and connecting to both terminals of the drive coil 66 with driver terminals 66a and 66b, through resistors R8 and R9, a reference voltage circuit 65 for comparator inputting output 63b of the amplifier 63 through resistor R11, and outputting a reference voltage 65d for comparator that is intermediate voltage between external power supply and the ground through a voltage follower 65c whose input terminal is connected to a junction point 65b of resistors R5 and R6 connecting to external power supply and the ground through external power supply terminals 68a and 68b, and a comparator 64 consisting of an inverter 64c inputting inversely an output 64b from a comparator 64a with hysteresis that is product of, ratio of a resistor R12 and a feedback resistor R13, and a value of external power supply (Vcc) and is necessary for it to work exactly when an output 63b of the amplifier 63 gets across a reference voltage 65d for comparator, and outputting a rotor position detection signal 64d, and a bipolar drive current which is supplied onto a drive coil 66 by a start pulse is fixed to either of a direction 66c or a direction 66d corresponding to the first reference voltage 61b for amplifier.

As shown in FIG. 7, a rotor position detector 70 using an inverter of the first embodiment of the present invention, comprises the first reference voltage circuit 71 for amplifier (the first reference voltage for amplifier is a voltage of a junction point 71a when analog switches SW5 and SW6 are turned on) connecting to an external power supply terminal 77a and a ground terminal 77b, and consisting of analog switches SW5 and SW6 that are turned on or off by an analog switching control signal 76a, and resistors R21 and R22 connecting to the analog switches SW5 and SW6, and connecting a junction point 71a of resistors R21 and R22 to either terminal of a drive coil 75 with driver junction terminals 75a and 75b, and similarly, the second reference voltage circuit 72 for amplifier (the second reference voltage for amplifier is a voltage of a junction point 71a when analog switches SW7 and SW8 are turned on) connecting to the external power supply terminal 77a and the ground terminal 77b, and consists of analog switches SW7 and SW8 that are turned on or off by an analog switching control signal 76b, and resistors R23 and R24 connecting to the analog switches SW7 and SW8, and connecting a junction point 72a of resistors R23 and R24 to either terminal of a drive coil 75 with driver junction terminals 75a and 75b, and an amplifier 73 consisting of an inverter 73a with a feedback resistor R26, connecting to either terminal of the drive coil 75 through resistor R25, and a comparator 74 consisting of inverters 74a and 74b, inputting an output 73b of the amplifier 73 through R27, and outputting a rotor position detection signal 74c, having a feedback resistor R28 and having hysteresis that is product of, ratio of a resistor R27 and a feedback resistor R28, and a value of external power supply (Vcc), and necessary for it to work exactly when an output 73b of amplifier 73 gets across the reference voltage (threshold) which it has corresponding to a reference voltage 65d of a reference voltage circuit 65 for comparator of the rotor position detector 60 using the operational amplifier of the present invention shown in FIG. 6, and a bipolar drive current supplied onto the drive coil 75 by the start pulse is fixed to either of the direction 75c or the direction 75d corresponding to the first reference voltage for amplifier.

A driving method of the present invention is explained, using FIG. 1-(a) that indicates a drive pulse, FIG. 1-(b) that indicates a voltage waveform after amplification, in a start rotation mode, FIG. 1-(c) that indicates a drive pulse, FIG. 1-(d) that indicates a voltage waveform after amplification, in a start non-rotation mode, of a first embodiment of the present invention, and FIG. 2-(a) that indicates a drive pulse, FIG. 2-(b) that indicates an analog switching control signal of the first reference voltage circuit for amplifier, FIG. 2-(c) that indicates an analog switching control signal of the second reference voltage circuit for amplifier in a start rotation mode, FIG. 2-(d) that indicates a drive pulse, FIG. 2-(e) that indicates an analog switching control signal of the first reference voltage circuit for amplifier, FIG. 2-(f) that indicates an analog switching control signal of the second reference voltage circuit for amplifier, in a start non-rotation mode, of the present invention. Still, in its explanation FIG. 8a and FIG. 8b that shows a rectangular and thin-type vibration motor employing the stepping motor used in the present invention, and FIG. 6 that shows a block diagram of a rotor position detector with an operational amplifier of the first embodiment of the present invention, and it is similar to FIG. 9a and FIG. 9b that shows another rectangular and thin-type vibration motor employing the stepping motor used in the present invention, and FIG. 7 that shows a block diagram of a rotor position detector with an inverter of the first embodiment of the present invention.

To start the stepping motor 80, at first, a start pulse 1 with a chopper pulse 2 by the drive pulse generation circuit 54 shown in FIG. 5 is output, by an analog switching control signal 1b that is inverted non-pulse interval 1a of the chopper pulse 2, the analog switches SW1 and SW2 of the first reference voltage circuit 61 for amplifier shown in FIG. 6, is turned on, and the first reference voltage 61b for amplifier that is set up resistance division of an external power supply voltage by resistors R1 and R2, as an output of a voltage follower 612, becomes the first reference voltage 61b for amplifier of an operational amplifier 63a of an amplifier 63 shown in FIG. 6. The first reference voltage 61b for amplifier (the first reference voltage 4a for amplifier indicated in FIG. 1-(b) and (d)) is set up higher than the upper threshold voltage 13a against the reference voltage 13 for comparator consisting of the upper threshold voltage 13a and the lower threshold voltage 13b that is an output 65d of the reference voltage circuit 65 of the comparator 64, and in s timing diagram of a voltage waveform after amplification in the start rotation mode, indicated in FIG. 1-(b), a counter electromotive voltage 7b of the start rotation of the rotor 82 at the start pulse 1 indicated as a broken line, gets over the upper threshold voltage 13a at a non-pulse interval 1a just before the chopper pulse 2 and at a non-pulse interval 2a by its getting down the upper threshold voltage 13a, a start rotation/non-rotation detecting means 54a which the drive pulse generation circuit 54 has, detects the rotation of the rotor 82 through the rotor position detection signal 51a which a comparator 51l outputs, and start rotation/non-rotation mode switching means 54c inputs a start rotation signal 54b which the start rotation/non-rotation detecting means 54a outputs and it is able to go to the start rotation mode, and a next drive pulse 3 of the start rotation mode is output by the drive pulse generation circuit 54, and the vibration motor 80 starts smoothly.

On the other hand, as indicated in FIG. 1-(d), as a counter electromotive voltage 24b indicated as a broken line, which is a voltage waveform after amplification at a start non-rotation and vibration of the rotor 82 at a start pulse 15 in the start non-rotation mode, at non-pulse interval of chopper pulses 16, 17, 18, 19 and 20, that is 15a, 16a, 17a, 18a, 19a and 20a, is getting over the upper threshold voltage 13a, the start rotation/non-rotation detecting means 54a that the drive pulse generation circuit 54 has, detects a start non-rotation and vibration of the rotor 82 from the rotor position detection signal 51a which the comparator 51l outputs, and the start rotation/non-rotation mode switching means 54c inputs a start non-rotation signal 54b which the start rotation non-rotation detecting means 54a outputs, and it is able to go to the start rotation mode, and the drive pulse generation circuit 54 outputs just after a non-pulse interval 20a in the start non-rotation mode next drive pulse 21 whose width is wider than that of next drive pulse 3 of the start pulse 1 in the start rotation mode, and the vibration motor 80 starts smoothly. Still, the first reference voltage 14a for amplifier larger, the detection of the start non-rotation more exact, nevertheless, as it is too large, in the case of the start rotation, it takes long time to detect the start rotation after the start pulse, so that next drive pulse of the start pulse which the drive pulse generation circuit 54 outputs, begins to delay, as the drive pulse to accelerate the vibration motor 80 sufficiently, it is necessary that its largeness is set up by starting performance of the rotor considered.

After the start pulse, one hand, the analog switching control signal 67a of the first reference circuit 61 for amplifier shown in FIG. 6, becomes "L", and the analog switches SW1 and SW2 are turned off, on the other hand, the analog switching control signal 67b of the second reference circuit 62 for amplifier, becomes "H", and the analog switches SW3 and SW4 are turned on, and the reference voltage of which amplifier 63 works on the basis becomes an output 62b of the voltage follower 612. The second reference voltage 62b for amplifier is the second reference voltage 14b for amplifier indicated in FIG. 1-(b) and (d), and as absolute value of the difference of voltage is set up smaller than that of the first reference voltage 14a for amplifier, from the upper threshold voltage 13a, at a high speed rotation, a time interval 5a which it takes for a counter electromotive voltage 11b generated by a drive pulse 5 to get across a lower threshold voltage 13b is able to be almost equal to a time interval 6a which it takes for a counter electromotive voltage 12b generated by a drive pulse 6 whose pulse width is equal to that of the drive pulse 5, to get across the upper threshold voltage 13a, the motor is able to be driven efficiently and the rotor is able to rotate at a high speed.

Also, as the first reference voltage 14a of amplifier 63 is able to be set up higher than the upper threshold voltage 13a of the reference voltage 13 of the comparator 64, in a case of non-rotation and vibration at the start pulse 15, at a non-pulse interval 15a just before a chopper pulse 16, it isn't detected incorrectly as a rotation, and it is able to go to the start non-rotation mode, in a case of rotation at the start pulse 1, after that, as it is able to go to the rotation mode, the vibration motor 80 is able to be started smoothly, and especially in the vibration motor 80 to whose rotor shaft 82b an eccentric weight 85 is secured, even if the state of its position makes load by one side weight of the eccentric weight 85 increase at the start, and that has effect that the vibration motor 80 is able to start smoothly.

Still, so far the explanation was that about a case that the first reference voltage 14a for amplifier was set up larger than the upper threshold voltage 13a, but in a case that the first reference voltage 14a for amplifier is set up smaller than the lower threshold voltage 13b, the direction of a bipolar drive current supplied onto the drive coil by the driver at the start pulse should be fixed to inverse.

Second Embodiment

Figure 8A:
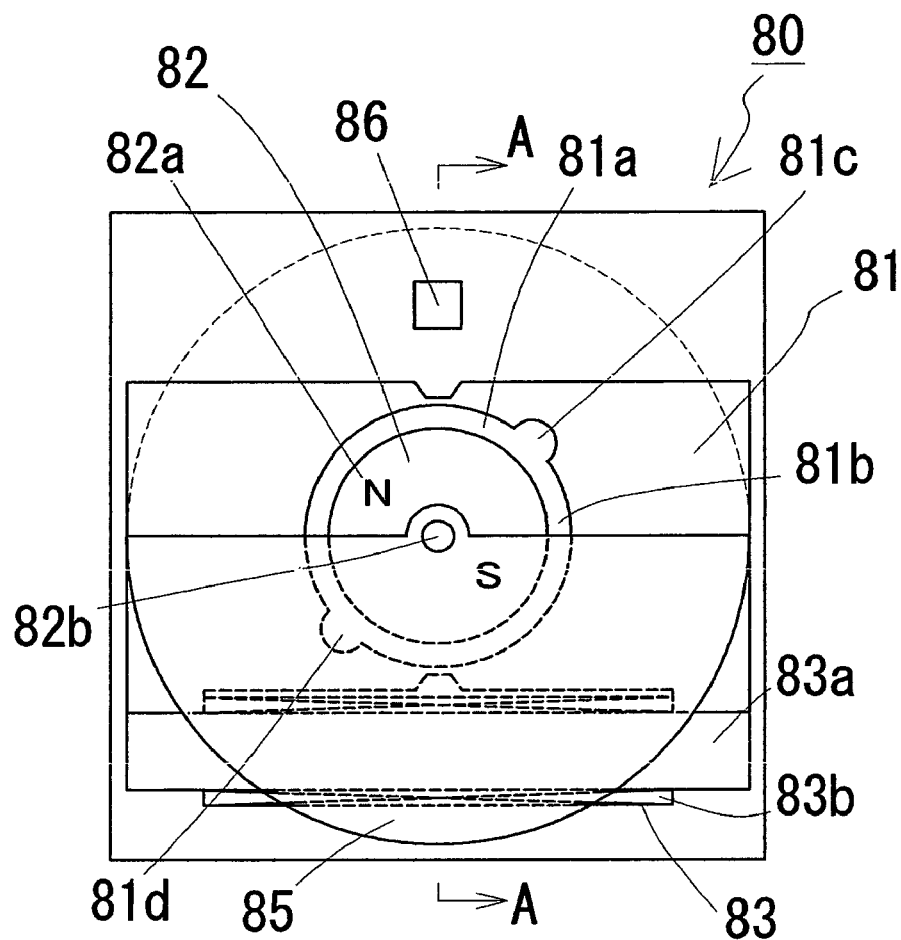
FIG. 8a and FIG. 8b show a top view, and a cross section taken on line A-A of FIG. 8a, of a rectangular and thin type vibration motor employing the stepping motor used in the present invention, respectively.
Figure 8B:
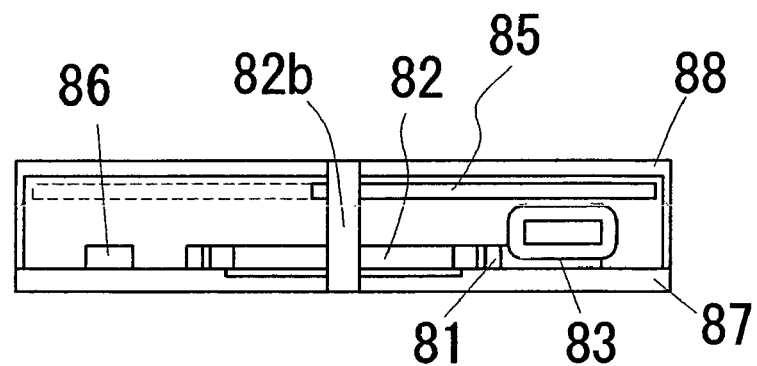
Figure 9A:
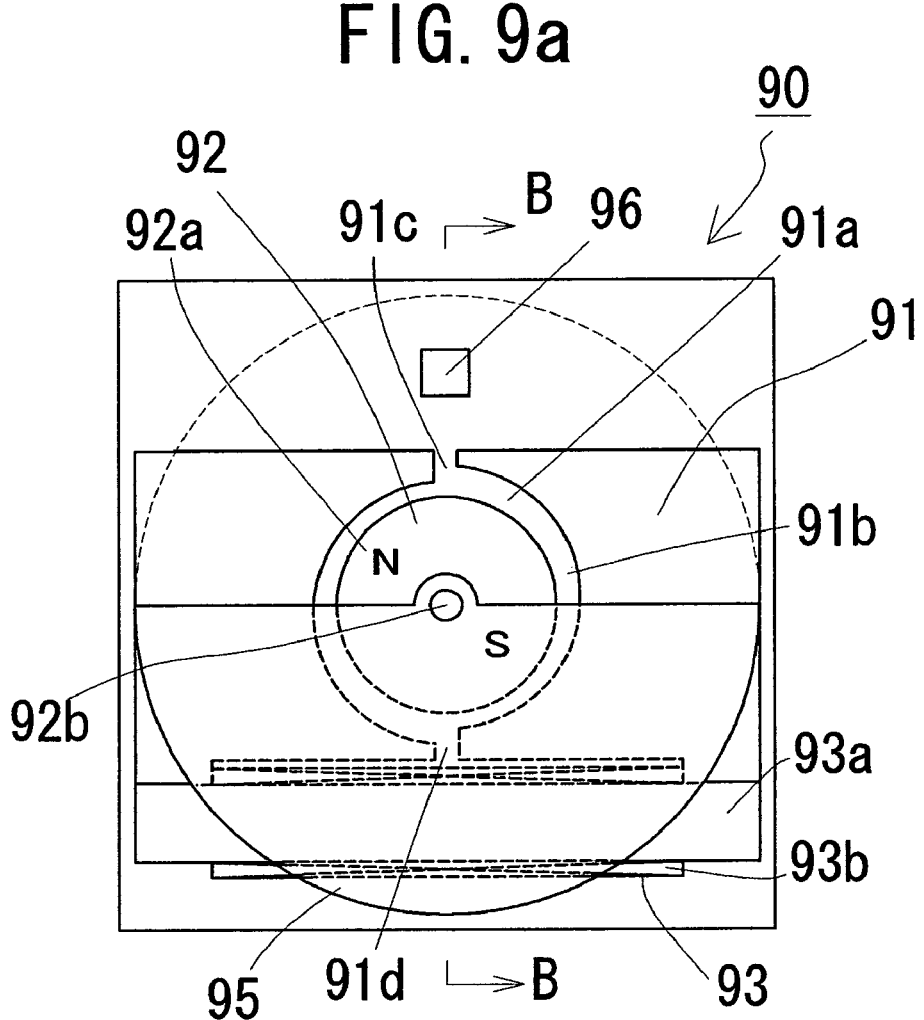
FIG. 9a and FIG. 9b show a top view, and a cross section taken on line B-B of FIG. 9a, of another rectangular and thin type vibration motor employing the stepping motor used in the present invention, respectively.
Figure 9B:
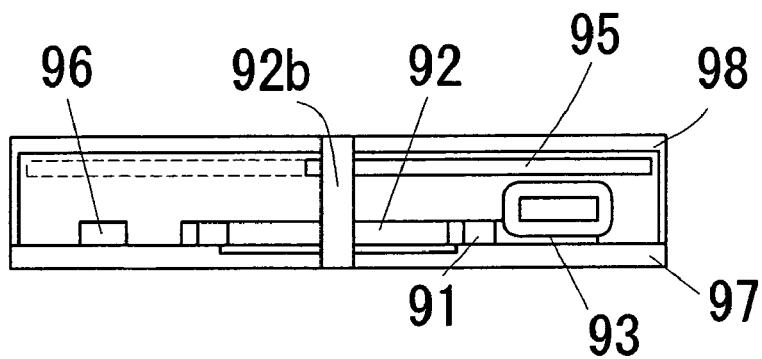
Figure 12:
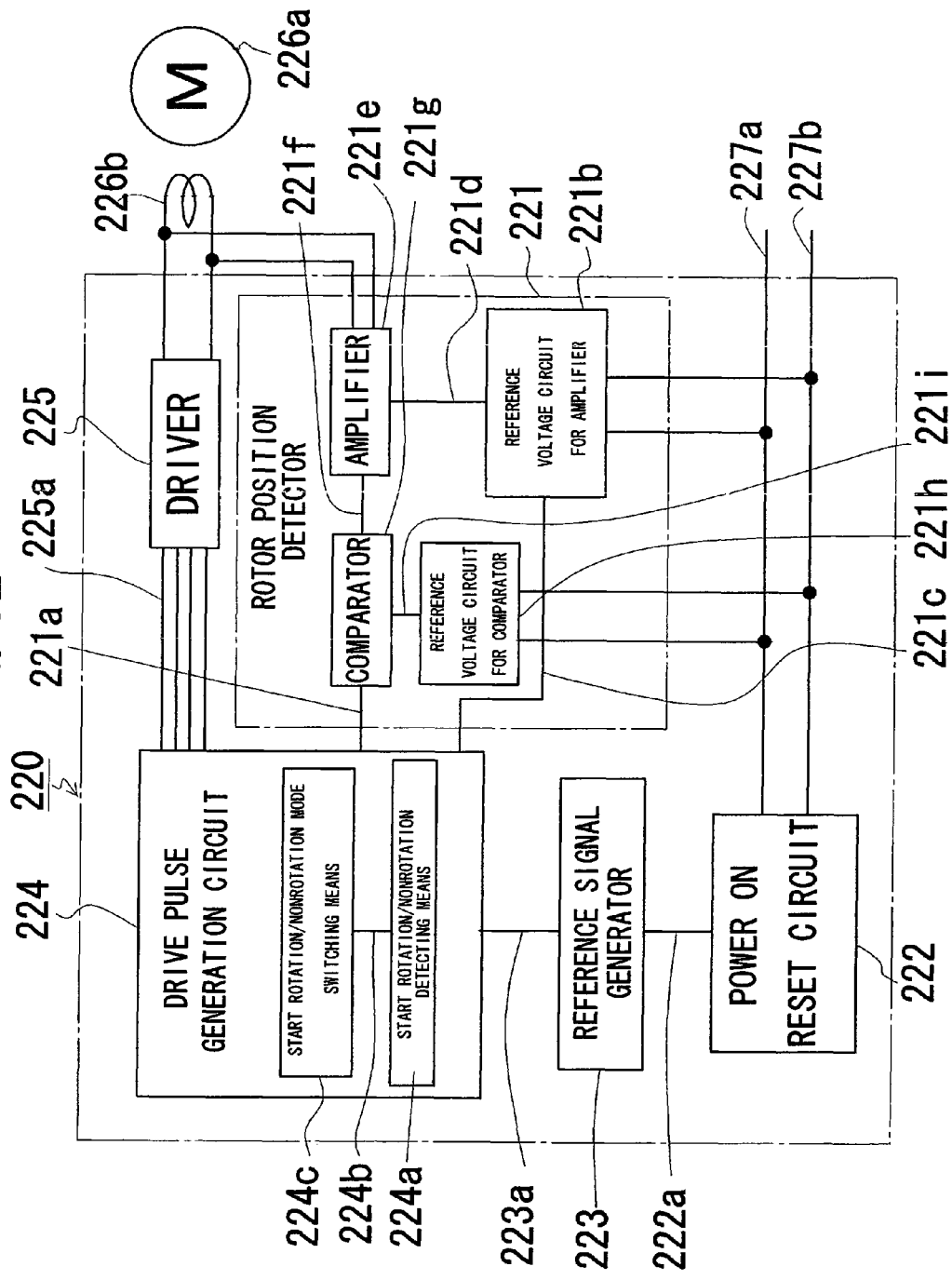
FIG. 12 shows a block diagram of a conventional driving circuit.
Figure 13:
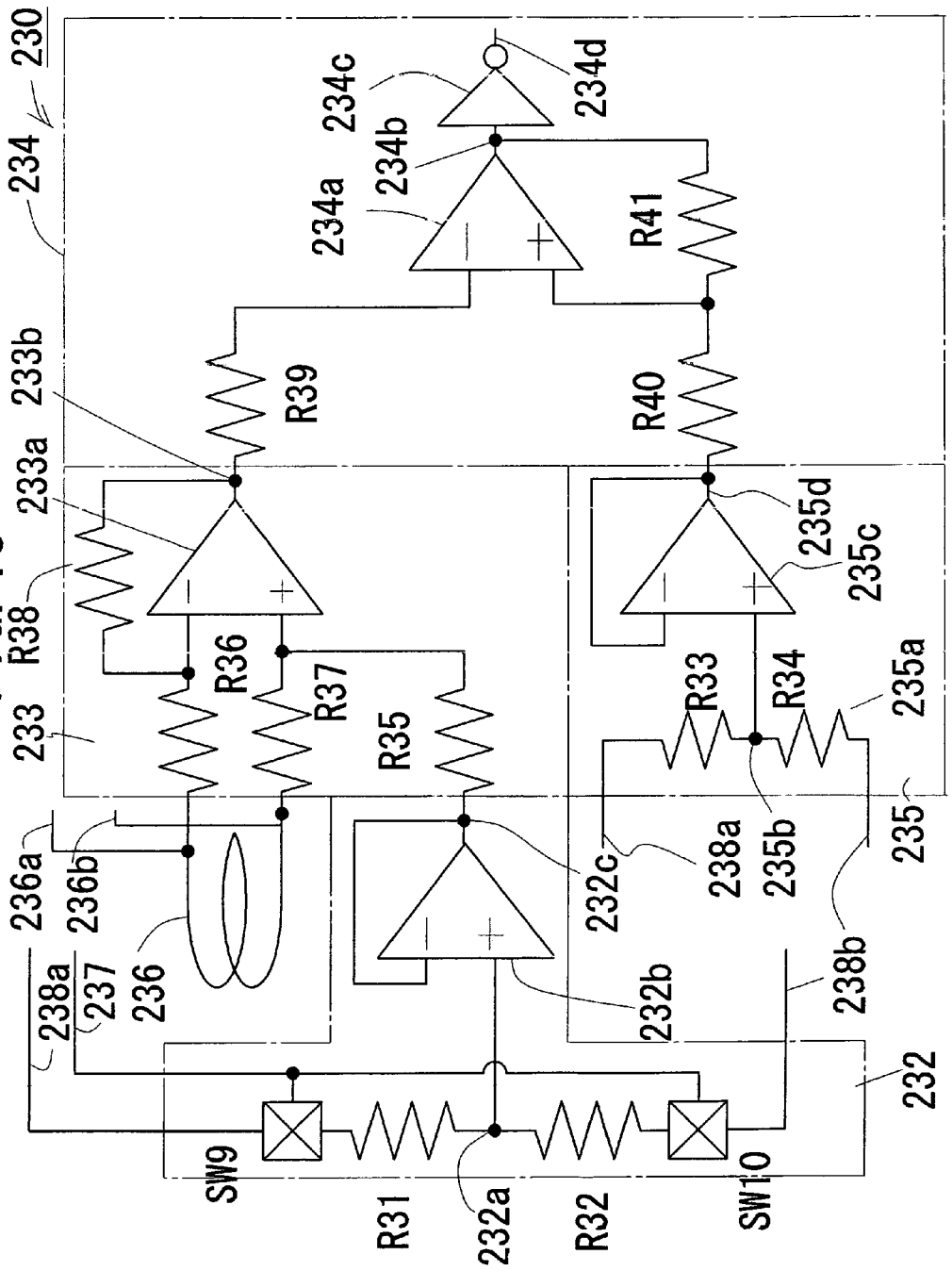
FIG. 13 shows a block diagram of a conventional rotor position detector with an operational amplifier.
Figure 14:
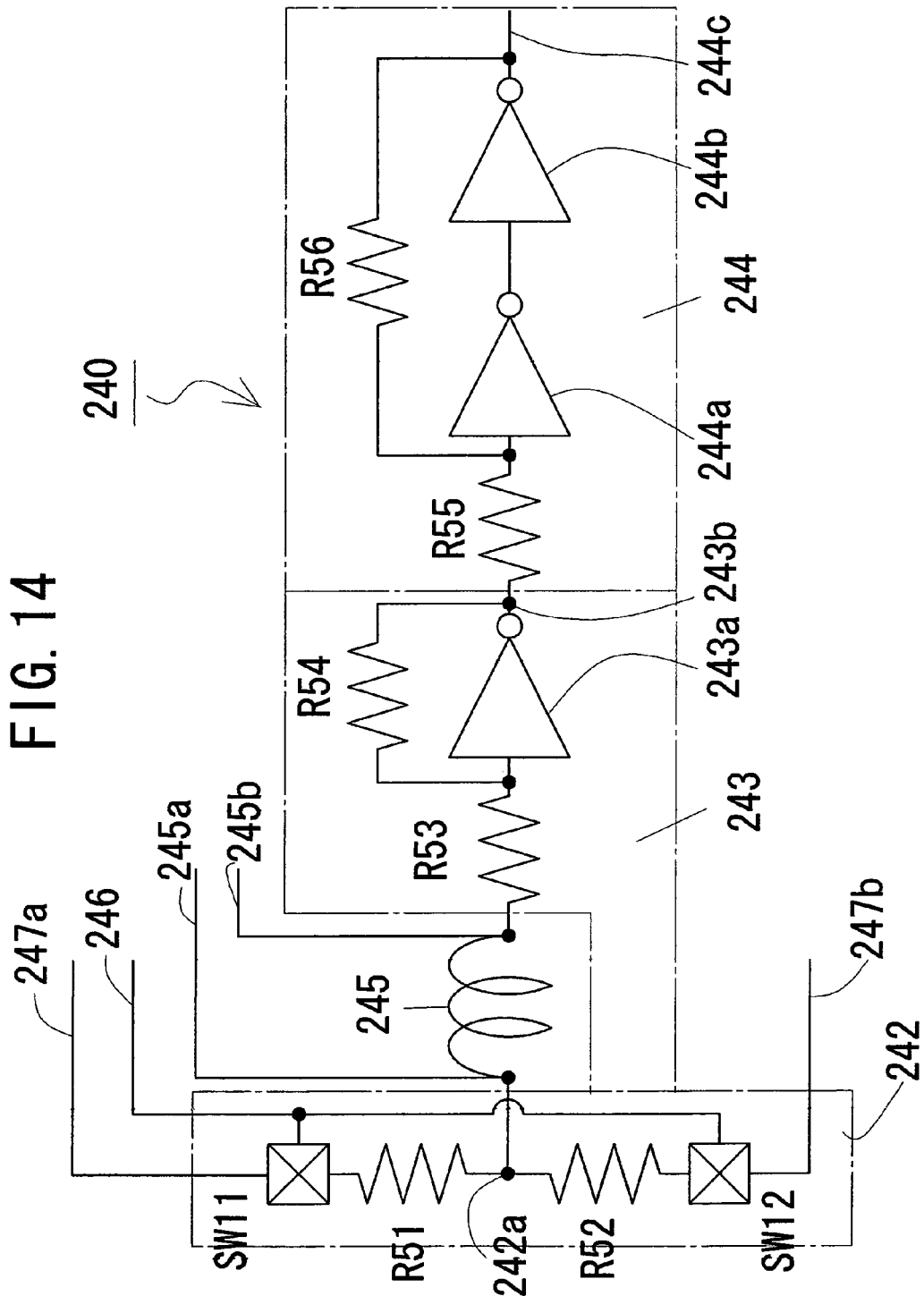
FIG. 14 shows a block diagram of a conventional rotor position detector with an inverter.
Figure 15:
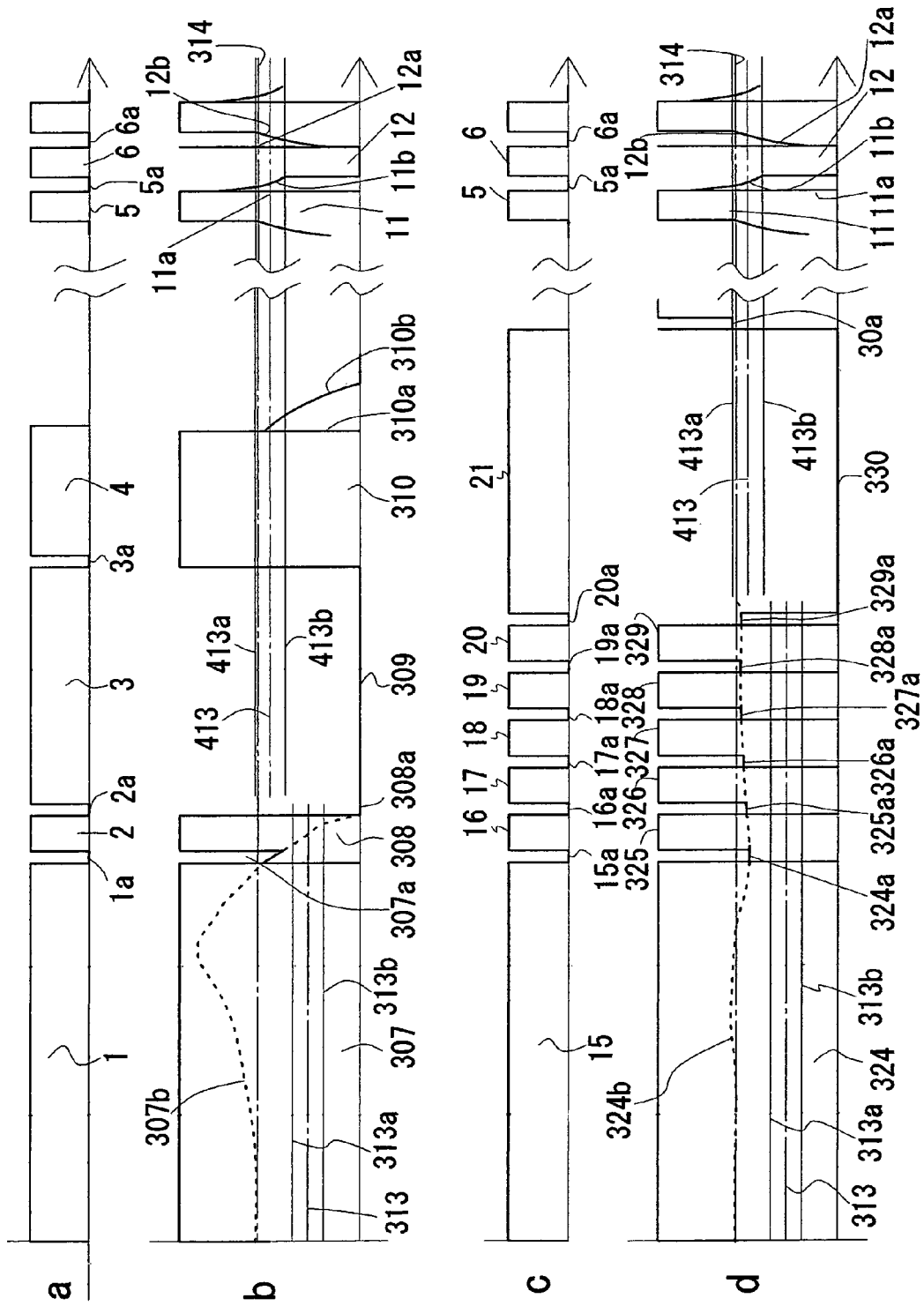
FIG. 15 shows a timing diagram in a start rotation/non-rotation mode of a second embodiment of the present invention.
Figure 16:
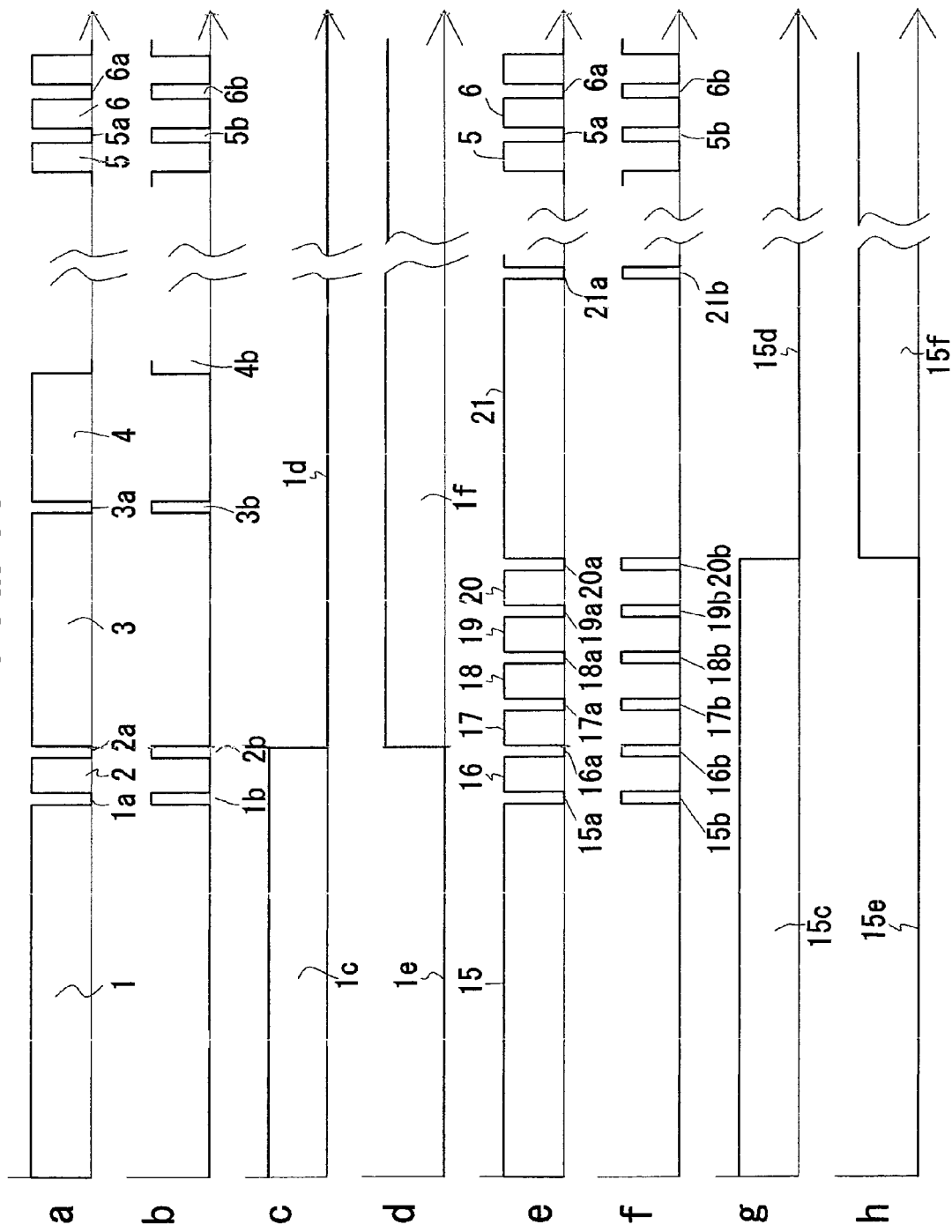
FIG. 16 shows a timing diagram in a start rotation/non-rotation mode of the second embodiment of the present invention.
Figure 17:
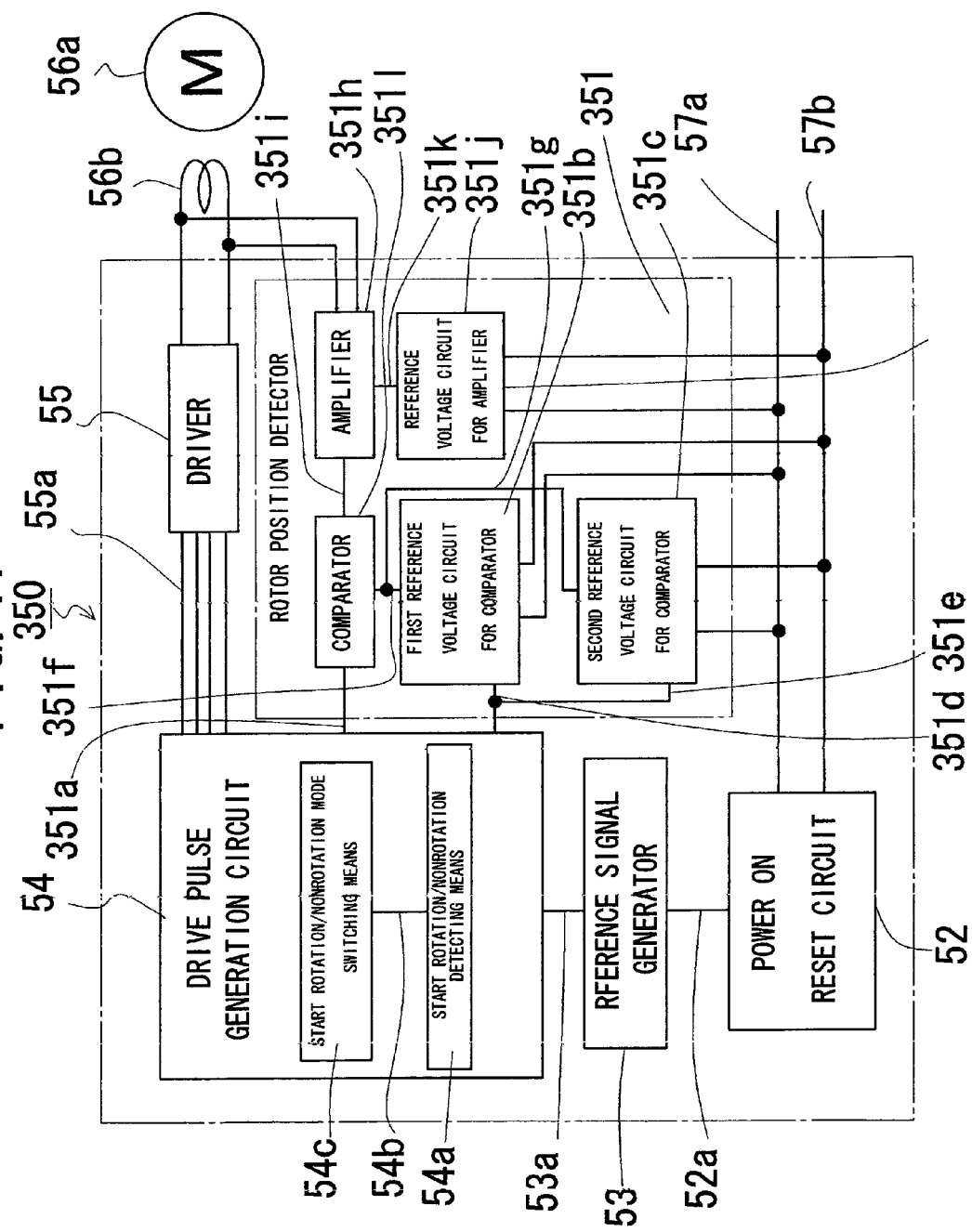
FIG. 17 shows a block diagram of a driving circuit of the second embodiment of the present invention.
Figure 18:
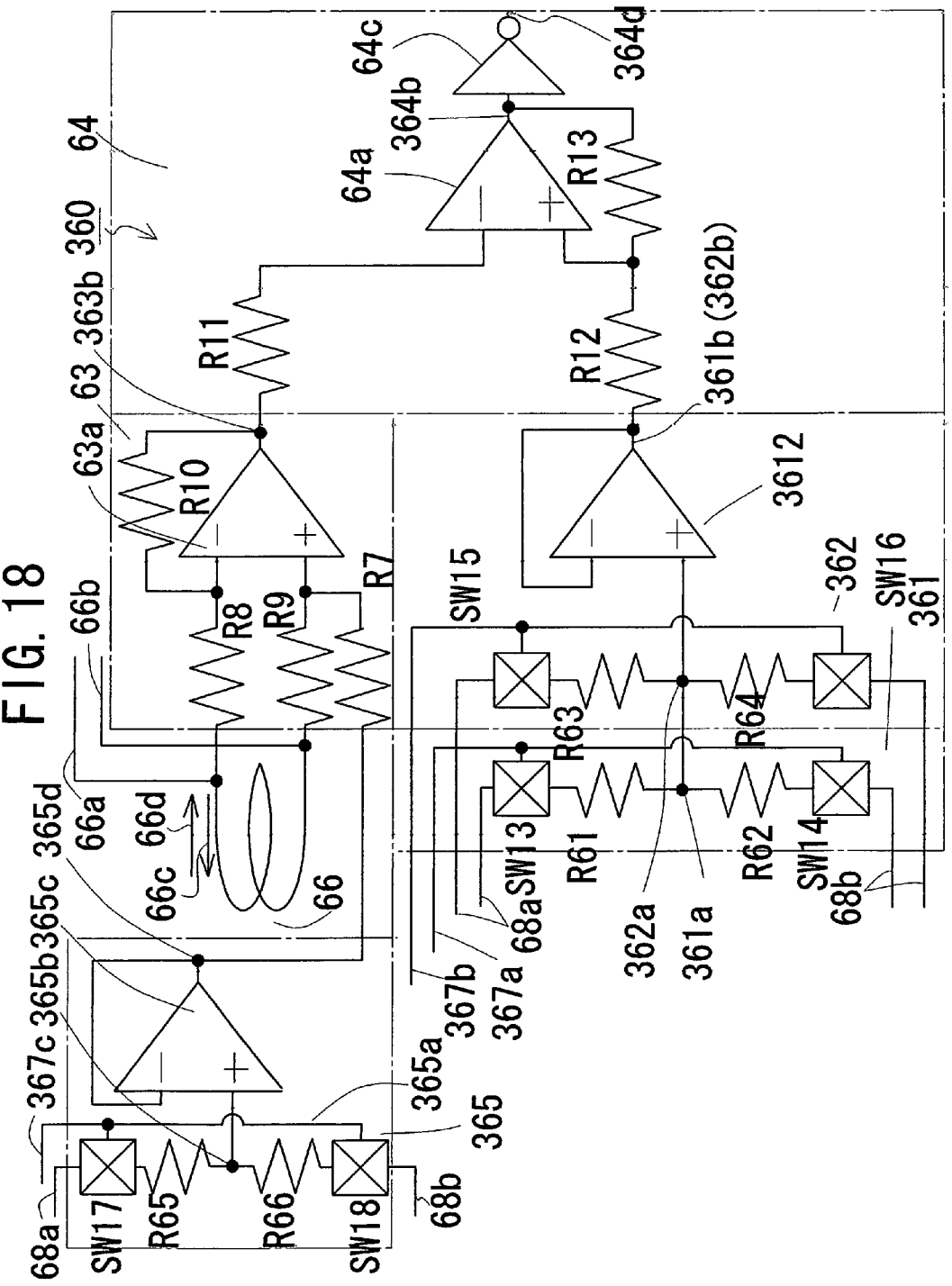
FIG. 18 shows a block diagram of a rotor position detector with an operational amplifier of the second embodiment of the present invention.

Next, the driving method and the driving circuit of the vibration motor of the present invention shown in FIG. 8a,
FIG. 8b, FIG. 9a a and FIG. 9b are explained, using FIG. 17 that shows a block diagram of a driving circuit of the second embodiment of the present invention, FIG. 18 that shows a block diagram of a rotor position detector with an operational amplifier of the second embodiment of the present invention which constitutes the driving circuit of the second embodiment of the present invention, FIG. 15-(a) that indicates a drive pulse, FIG. 15-(b) that indicates a voltage waveform after amplification, in the start rotation mode, FIG. 15-(c) indicates the drive pulse, FIG. 15-(d) that indicates the voltage waveform after amplification, in the start non-rotation mode, of a second embodiment of the present invention, FIG. 16-(a) that indicates the drive pulse, FIG. 16-(b) that indicates the analog switching control signal of the reference voltage circuit for amplifier, FIG. 16-(c) that indicates the analog switching control signal of the first reference voltage circuit for comparator, FIG. 16-(d) that indicates the analog switching control signal of the second reference voltage circuit for comparator, in the start rotation mode, FIG. 16-(e) that indicates the drive pulse, FIG. 16-(f) that indicates the analog switching control signal of reference voltage circuit for amplifier, FIG. 16-(g) that indicates the analog switching control signal of the first reference voltage circuit for comparator and FIG. 16-(h) that indicates the analog switching control signal of the second reference voltage circuit for comparator, in the start non-rotation mode, of the second embodiment of the present invention.

As shown in FIG. 17, the different structure between a driving circuit 350 of the second embodiment of the present invention and the driving circuit 50 of the first embodiment, is a rotor position detector 351, the rotor position detector 351 comprises a reference voltage circuit 351j for amplifier, an amplifier 351h working on the basis of a reference voltage 351k for amplifier that the reference voltage circuit 351j for amplifier outputs, a comparator 351l comparing an output 361i of the amplifier 351h with a reference voltage 351f which the first reference voltage circuit 351b for comparator outputs, on the basis of a reference voltage 351g for comparator which the second reference voltage circuit 351c for comparator outputting, and outputs a rotor position detection signal 351a to the drive pulse generation circuit 54.

The different structure between FIG. 18 that shows a block diagram of a rotor position detector block diagram using an operational amplifier of the second embodiment of the present invention and the first embodiment, is that a rotor position detector 360 consisting of an operational amplifier comprises a first reference voltage circuit 361 for comparator connecting to external power supply terminals 68a and 68b, consisting of analog switches SW13 and SW14 that is turned on or off by an analog switching control signal 367a, and resistors R61 and R62 connecting to the analog switches SW13 and SW14, and outputting the first reference voltage 361b for comparator through a voltage follower 3612 to whose input terminal junction point 361a of resistors R61 and R62 is connected, and similarly, comprises the second reference voltage circuit 362 for comparator consisting of analog switches SW15 and SW16 that are turned on or off by an analog switching control signal 367b, and resistors R63 and R64 connecting to the analog switches SW15 and SW16, and outputting the second reference voltage 362b for comparator through a voltage follower 3612 to whose input terminal junction point 362a of resistors R63 and R64 is connected, and the reference voltage circuit 365 for amplifier outputting the reference voltage 365d for amplifier that is an intermediate voltage between the external power supply and the ground through voltage follower 365c to whose input terminal junction point 365b of resistors R65 and R66 connecting to the external power supply and the ground through the external power supply terminals 68a and 68b, is connected.

The driving method of the second embodiment of the present invention is explained, using FIG. 15-(a) that indicates a drive pulse, FIG. 15-(b) that shows a timing diagram of a voltage waveform after amplification, FIG. 15-(c) that indicates the drive pulse and FIG. 15-(d) that indicates the voltage waveform after amplification, in the start non-rotation mode, of a second embodiment of the present invention, FIG. 16-(a) that indicates a drive pulse, FIG. 16-(b) that indicates an analog switching control signal of reference voltage circuit for amplifier, FIG. 16-(c) that indicates an analog switching control signal of the first reference voltage circuit for comparator, FIG. 16-(d) that indicates an analog switching control signal of the second reference voltage circuit for comparator, in the start rotation mode, FIG. 16-(e) that indicates the drive pulse, FIG. 16-(f) that indicates the analog switching control signal of reference voltage circuit for amplifier, FIG. 16-(g) that indicates the analog switching control signal of the first reference voltage circuit for comparator and FIG. 16-(h) that indicates the analog switching control signal of the second reference voltage circuit for comparator, in the start non-rotation mode, of the second embodiment of the present invention. Still, in its explanation FIG. 8a and FIG. 8b that show the rectangular and thin-type vibration motor employing the stepping motor used in the present invention, and FIG. 18 that shows a block diagram of the rotor position detector with the operational amplifier of the second embodiment of the present invention, are used, and it is similar to another rectangular and thin type vibration motor employing the stepping motor used in the present invention, shown in FIG. 9a and FIG. 9b.

To start the stepping motor 80, at first, the start pulse 1 with the chopper pulse 2 is output from the drive pulse generation circuit 54 shown in FIG. 17, and by the analog switching control signal 1b that is inversed the non-pulse interval 1a of the chopper pulse 2, analog switches SW17 and SW18 of the reference voltage circuit 365 for amplifier shown FIG. 18 is turned on, and the reference voltage 365d for amplifier which is set up by residence division of external power supply voltage by resistors R65 and R66 as an output of the voltage follower 365c, becomes the reference voltage 365d for amplifier of the operational amplifier 63a of the amplifier 63 (the reference voltage 314 for amplifier indicated in FIG. 15-(b) and (d)), and also at the start pulse 1, by an analog control signal 1c analog switches SW13 and SW14 of the first reference voltage circuit 361 for comparator shown in FIG. 18 are turned on, and the first reference voltage 361b for comparator which is set up by residence division of external power supply voltage by resistors R61 and R62 as an output of a voltage follower 3612, becomes the first reference voltage 361b for comparator of the operational amplifier 64a of the comparator 64, and an upper threshold voltage 313a of hysteresis consisting of the upper threshold voltage 313a and the lower threshold voltage 313b, which on the basis of the first reference voltage 361b for comparator (the first reference voltage 313 for comparator indicated in FIG. 15-(b) and (d)), is set up lower than the reference voltage 365d for amplifier which the reference voltage circuit 365 for amplifier outputs, and in a voltage waveform after amplification in the start rotation mode, a counter electromotive voltage 307b indicated as a broken line in FIG. 1-(b), in the start rotation of the rotor 82 at the start pulse 1, gets over the upper threshold voltage 313a at the non-pulse interval 1a just before the chopper pulse 2, and at the non-pulse interval 2a, by its getting down the upper threshold voltage 313a, the start rotation/non-rotation detecting means 54a which the drive pulse generation circuit 54 has, detects the rotation of the rotor 82 from the rotor position detection signal 351a which the comparator 351l outputs, and the start rotation/non-rotation mode switching means 54c inputs the start rotation signal 54b which the start rotation/non-rotation detecting means 54a outputs, and it goes to the start rotation mode, and next drive pulse 3 in the start rotation mode is output from the drive pulse generation circuit 54, and the vibration motor starts smoothly.

On the other hand, as indicated in FIG. 15-(d), as the counter electromotive voltage 324b indicated as a broken line, which is a voltage waveform after amplification of the start non-rotation and vibration of the rotor 82 in the start non-rotation mode, is getting over the upper threshold voltage 313a at non-pulse intervals of chopper pulses 16, 17, 18, 19 and 20, that is 15a, 16a, 17a, 18a, 19a and 20a, the start rotation/non-rotation detecting means 54a which the drive pulse generation circuit 54 has, detects the start non-rotation and vibration of the rotor 82 from the rotor position detection signal 351a which the comparator 351l outputs, and start rotation/non-rotation mode switching means 54c inputs a start non-rotation signal 54b which the start rotation/non-rotation detecting means 54a outputs, and it goes to the start non-rotation mode, and the drive pulse generation circuit 54 outputs the drive pulse 21 next in the start non-rotation mode, whose pulse width is wider than that of a drive pulse 3 next after the start pulse 1 in the start rotation mode just after the non-pulse interval 20a, and the vibration motor 80 starts smoothly. Still, the first reference voltage 313a for comparator is made smaller, the detection of the start non-rotation becomes more exact, nevertheless, if it is too small, in a case of the start rotation mode, it takes much time to detect the start rotation after the start pulse, next drive pulse next after the start pulse which the drive pulse generation circuit 54 outputs, begin to delay, as the drive pulse gets not to be able to accelerate the vibration motor 80 sufficiently, it is necessary that its largeness is set up by starting performance of the rotor considered.

After the start pulse, an analog switching control signal 367a of the first reference circuit 361 for comparator shown in FIG. 18, becomes "L" (in FIG. 16, from 1c to 1d in the start rotation mode and from 15c to 15d in the start non-rotation mode), analog switches SW13 and SW14 are turned off, on the other hand, an analog switching control signal 367b of the second reference circuit 362 for comparator, becomes "H" (in FIG. 16, it becomes from 1e to 1f in the start rotation mode and it becomes from 15e to 15f in the start non-rotation mode), analog switches SW15 and SW16 are turned on, the reference voltage working as the basis of the comparator 64 becomes an output 362b of a voltage follower 3612. The second reference voltage 362b for comparator is the second reference voltage 413 for comparator indicated in FIG. 15-(b) and (d), as absolute value of the difference of voltage of the upper threshold voltage 413a is set up smaller than that of an upper threshold voltage 313a on the basis of the first reference voltage 313 for comparator, from the reference voltage 314 for amplifier, at a high speed rotation, the time interval 5a which it takes for a counter electromotive voltage 11b of a drive pulse 5 to get cross the lower threshold voltage 413b is able to be set up equal to the time interval 6a which it takes for the counter electromotive voltage 12b of a drive pulse 6 whose pulse width is equal to that of the drive pulse 5 to get across the upper threshold voltage 413a, and as the motor can be driven efficiently, the rotor 82 can rotate at a high speed.

Also, as the reference voltage 314 of amplifier 63 is able to be set up higher than the upper threshold voltage 313a of the first reference voltage 313 comparator 64, at the start pulse 15 in a case of the non-rotation and vibration, at a non-pulse interval 15a just before a chopper pulse 16, it is not detected incorrectly as the rotation, it is able to go to the start non-rotation mode, in a case of the rotation at the start pulse 1, as after that it is able to go to the rotation mode, the vibration motor 80 can start smoothly, especially in the vibration motor 80 to whose rotor shaft 82b the eccentric weight 85 is secured, even if the state of position of the motor makes load of one side weight of an eccentric weight 85 increase at the start, that has effect that the vibration motor 80 can start smoothly.

Still, so far explanation is that about a case that the reference voltage 314 for amplifier is set up higher than the upper threshold voltage 313a, but in a case that the reference voltage 314 for amplifier is set up smaller than the lower threshold voltage 313b, the direction of a bipolar drive current onto the drive coil by the driver at the start pulse should be fixed inversely.

Third Embodiment

Next, it is necessary for the motor performance to be raised for miniaturization of the vibration motor 80, and then, an embodiment using the stepping motor whose the gap 81a between the permanent magnet 82a of the rotor 82 and the yoke 81 is made small and whose magnetic coupling between the permanent magnet 82a of the rotor 82 and the yoke 81 is made stronger is explained in details.

Figure 19:
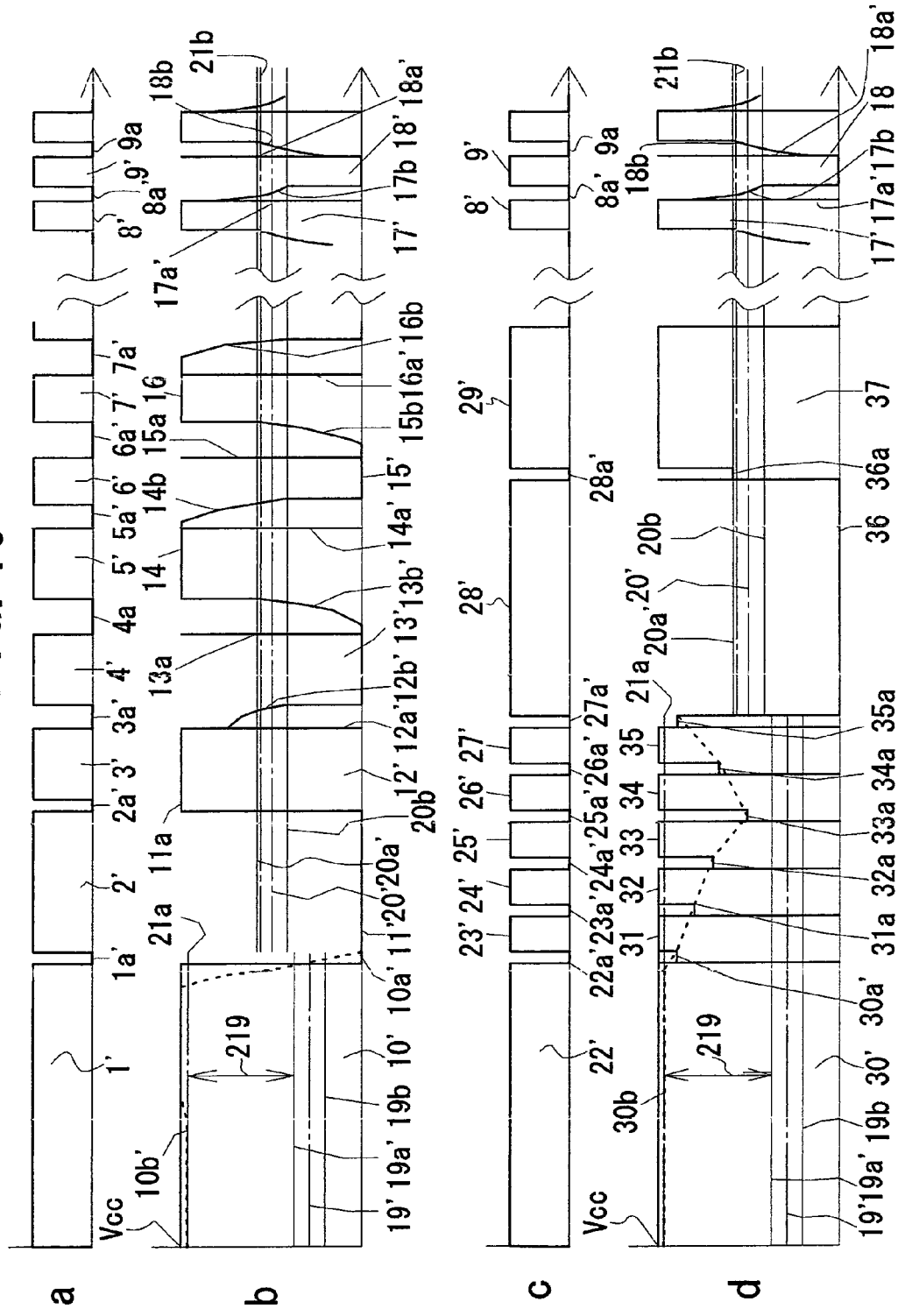
FIG. 19 shows a timing diagram in a start rotation/non-rotation mode of a third embodiment of the present invention.
Figure 20:
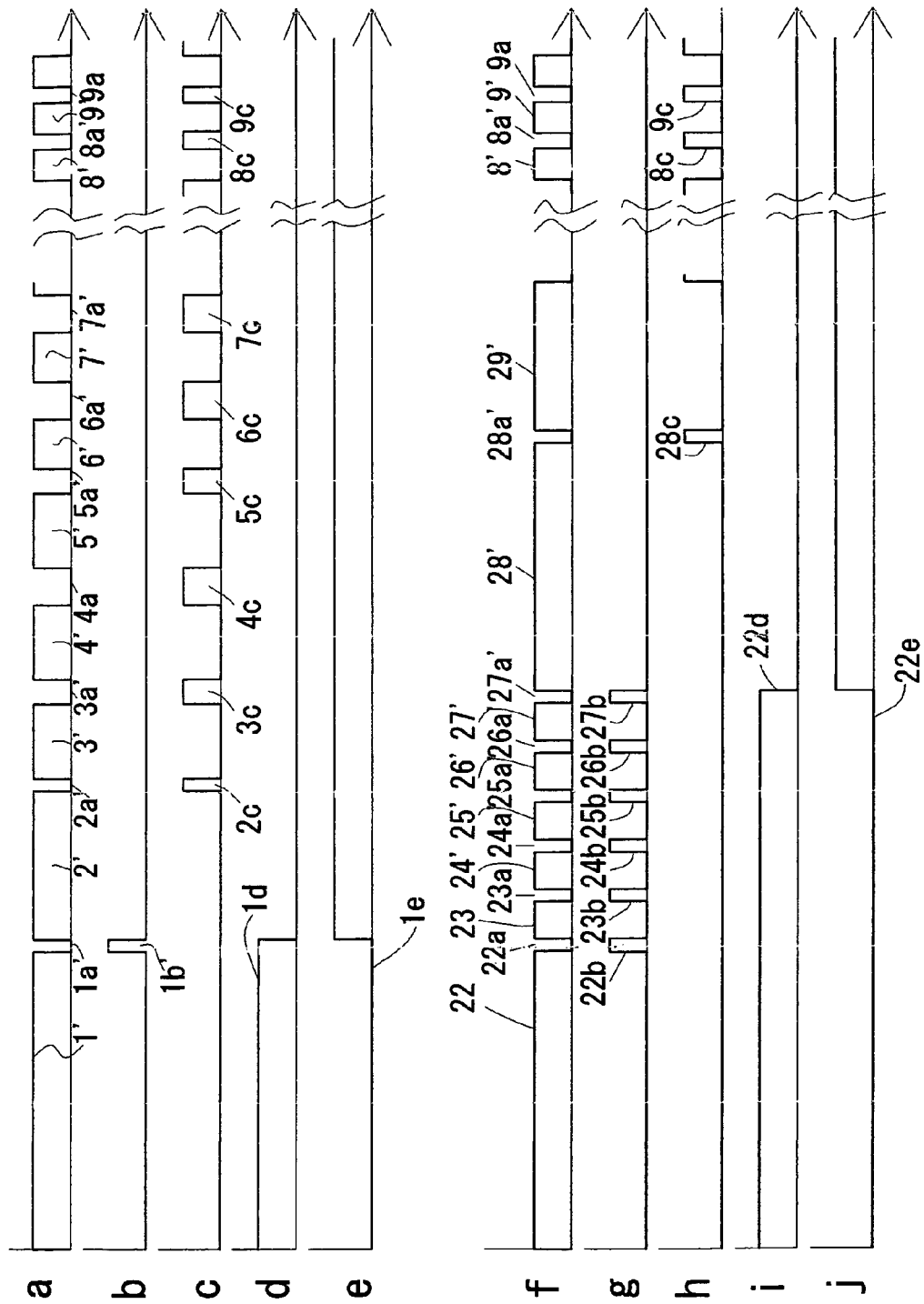
FIG. 20 shows a timing diagram in a start rotation/non-rotation mode of the third embodiment of the present invention.
Figure 21:
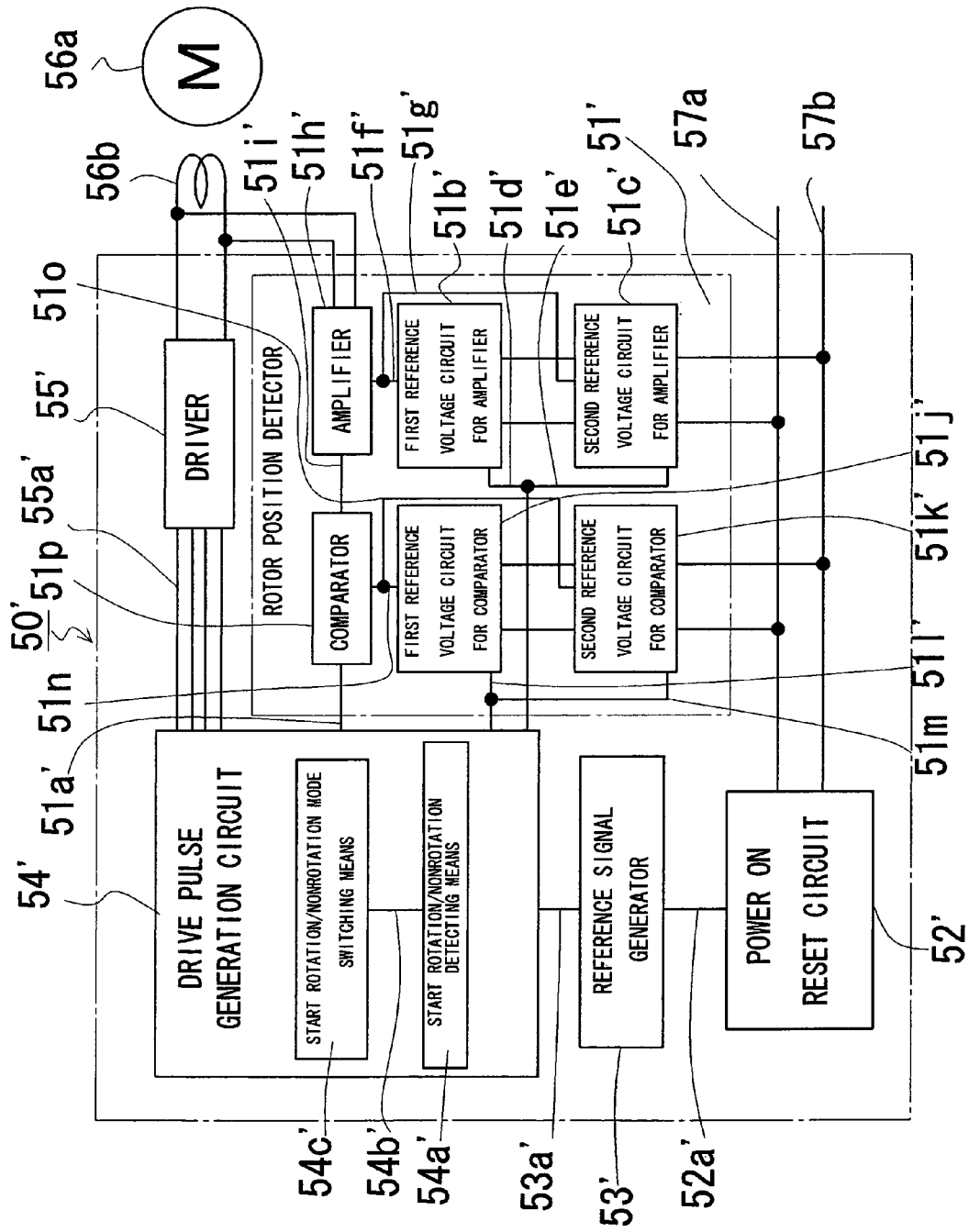
FIG. 21 shows a block diagram of a driving circuit of the third embodiment of the present invention.
Figure 22:
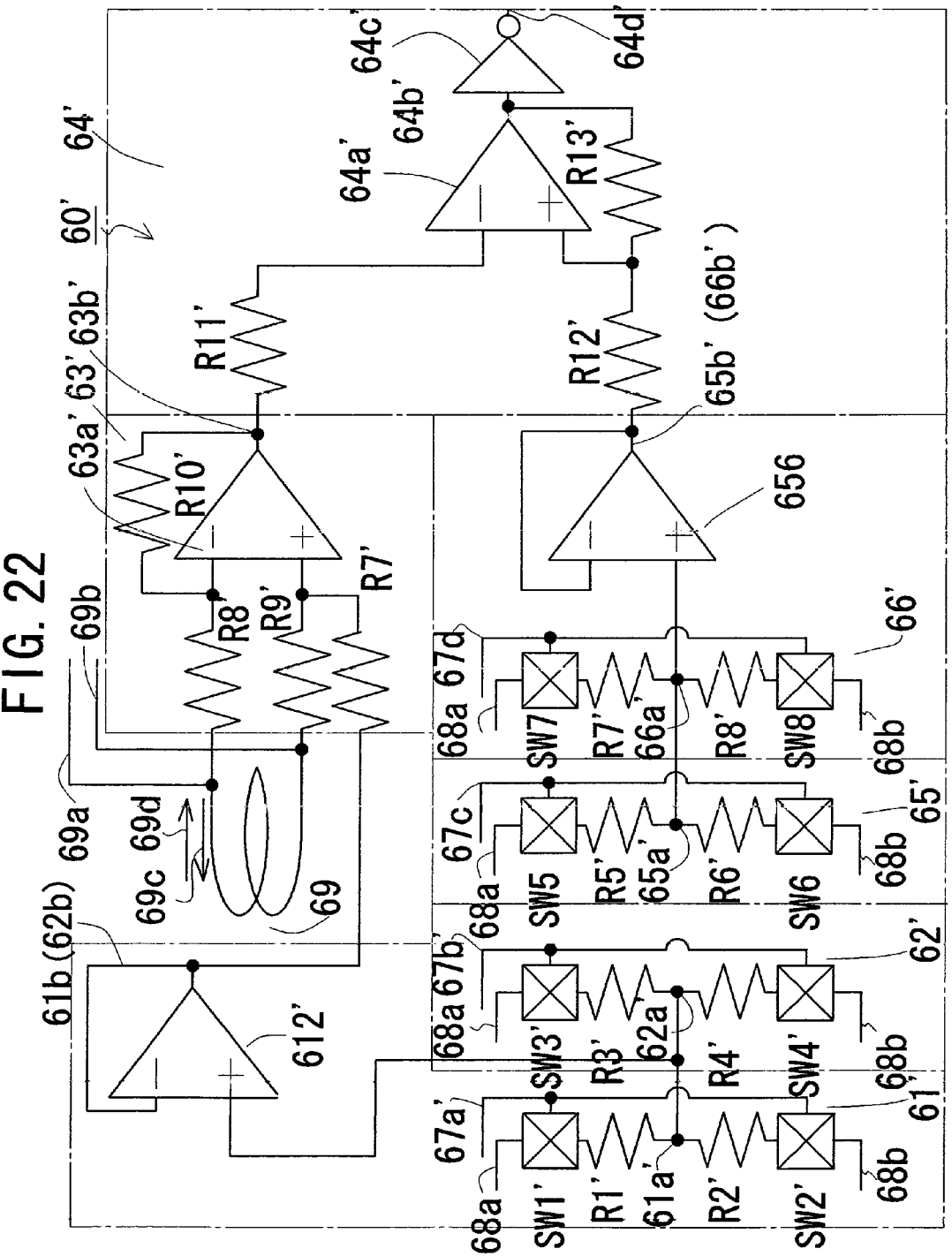
FIG. 22 shows a block diagram of a rotor position detector with an operational amplifier of the third embodiment of the present invention.

The driving method and the driving circuit of the present invention employed by the rectangular and thin type vibration motor shown in FIG. 8a, FIG. 8b, FIG. 9a and FIG. 9b is explained, using FIG. 21 that shows a block diagram of a driving circuit of the third embodiment of the present invention, FIG. 22 that shows a block diagram of the rotor position detector with the operational amplifier of the third embodiment of the present invention which constitutes the driving circuit of the third embodiment of the present invention, FIG. 19-(a) that indicates a drive pulse, FIG. 19-(b) that indicates a voltage waveform after amplification, in the start rotation mode, FIG. 19-(c) that indicates the drive pulse, FIG. 19-(d) that indicates the voltage waveform after amplification, in the start non-rotation mode, of a third embodiment of the present invention, FIG. 20-(a) that indicates a drive pulse, FIG. 20-(b) that indicates an analog switching control signal of the first reference voltage circuit for amplifier, FIG. 20-(c) that indicates an analog switching control signal of the second reference voltage circuit for amplifier, FIG. 20-(d) that indicates an analog switching control signal of the first reference voltage circuit for comparator, FIG. 20-(e) that indicates an analog switching control signal of the second reference voltage circuit for comparator, in the start rotation mode, FIG. 20-(f) that indicates the drive pulse, FIG. 20-(g) that indicates an analog switching control signal of the first reference voltage circuit for amplifier, FIG. 20-(h) that indicates the analog switching control signal of the second reference voltage circuit for amplifier, FIG. 20-(i) that indicates the analog switching control signal of the first reference voltage circuit for comparator and FIG. 20-(j) that indicates the analog switching control signal of the second reference voltage circuit for comparator, in the start non-rotation mode, of the third embodiment of the present invention.

As shown in FIG. 21, the present driving circuit 50' comprises a rotor position detector 51' connecting to both terminals of the drive coil 56b of the stepping motor 56a shown in FIG. 8a, FIG. 8b, FIG. 9a and FIG. 9b and detecting a rotor position, a power on reset circuit 52' connecting to external power supply terminals 57a and 57b, and as external power supply is supplied, outputting a motor control signal 52a' that turns the motor on, and also as the external power supply is cut off, outputting the motor control signal 52a' that turns motor off, and a reference signal generator 53' inputting a motor control signal 52a' from the power on reset circuit 52' and generating the reference signal 53a', the drive pulse generation circuit 54' outputting a drive pulse 55a' at timing of a rotor position detection signal 51a' that the rotor position detector 51' outputs on the basis of the reference signal 53a' from the reference signal generator 53', and having, explained in details hereinafter, rotation/non-rotation detecting means 54a' and start rotation/non-rotation mode switching means 54c' inputting a start rotation/non-rotation detection signal 54b' that start rotation/non-rotation detecting means 54a' outputs, and the driver 55' inputting the drive pulse 55a' and supplying a bipolar drive current onto the drive coil 56b.

The rotor position detector 51' comprises a first reference voltage circuit 51b' for amplifier, a second reference voltage circuit 51c' for amplifier, an amplifier 51h' working on the basis of a first reference voltage 51f for amplifier that the first reference voltage circuit 51b' for amplifier outputs and a second reference voltage 51g' for amplifier that the second reference voltage circuit 51c' for amplifier outputs, and a comparator 51p comparing an output 51i' of the amplifier 51h' with a first reference voltage 51n for comparator that a first reference voltage circuit 51j' for comparator on the basis of a second reference voltage 51o for comparator that a second reference voltage circuit 51k' for comparator outputs and outputting a rotor position detection signal 51a' to the drive pulse generation circuit 54'.

As shown in FIG. 22 that shows a block diagram of a rotor position detector with an operational amplifier of the third embodiment of the present invention, a rotor position detector 60' consisting of the operational amplifier comprises a first reference voltage circuit 61' for amplifier consisting of analog switches SW1' and SW2' connecting to external power supply terminals 68a and 68b and turning on or off by an analog switching control signal 67a', and resistors R1' and R2' connecting to the analog switches SW1' and SW2', and outputting the first reference voltage 61b for amplifier through a voltage follower 612' whose input terminal is connected to a junction point 61a' of resistors R1' and R2', and similarly a second reference voltage circuit 62' for amplifier consisting of analog switches SW3' and SW4' turning on or off by an analog switching control signal 67b', and resistors R3' and R4' connecting to the analog switches SW3' and SW4' and outputting the second reference voltage 62b for amplifier through a voltage follower 612' whose input terminal is connected to a junction point 62a' of resistors R3' and R4', an amplifier 63' working on the basis of an output 61b or 62b of the voltage follower 612' through R7', connecting to both terminals of a drive coil 69 with driver terminals 69a and 69b through resistors R8' and R9', and consists of an operational amplifier 63a' with a feedback resistor R10', the first reference voltage circuit 65' for comparator outputting the first reference voltage 65b' for comparator through a voltage follower 656 whose input terminal is connected to a junction point 65a' of resistors R5' and R6' connecting to external power supply and its ground through external power supply terminals 68a and 68b, a second reference voltage circuit 66' for comparator outputting the second reference voltage 66b' for comparator through the voltage follower 656 whose input terminal is connected to a junction point 66a' of resistors R7' and R8' connecting to external power supply and its ground through external power supply terminals 68a and 68b, and a comparator 64' inputting an output 63b' of the amplifier 63' through a resistor R11', working on the basis of the output 65b' (66b') of the voltage follower 656 through R12', inputting inversely the output 64b' from the comparator 64a' having hysteresis that is product of, ratio of a resistor R12' and a feedback resistor R13', and a external power supply value (Vcc) that is necessary for it to work exactly when the output 63b' of amplifier 63' gets across the reference voltage 65b' (66b') for comparator, and consists of an inverter 64c' which outputs a rotor position detection signal 64d', and a bipolar drive current supplied onto a drive coil 69 at the start pulse, is fixed to either of the direction 69c or 69d of the first reference voltage 61b for amplifier.

The driving method of the present invention is explained, using FIG. 19-(*a*) that indicates drive pulse, FIG. 19-(*b*) that indicates a voltage waveform after amplification, in the start rotation mode, FIG. 19-(*c*) that indicates the drive pulse, FIG. 19-(*d*) that indicates the voltage waveform after amplification, in the start non-rotation mode, of the third embodiment of the present invention, FIG. 20-(*a*) that indicates a drive pulse, FIG. 20-(*b*) that indicates an analog switching control signal of the first reference voltage circuit for amplifier, FIG. 20-(*c*) that indicates an analog switching control signal of the second reference voltage circuit for amplifier, FIG. 20-(*d*) that indicates an analog switching control signal of the first reference voltage circuit for comparator, FIG. 20-(*e*) that indicates an analog switching control signal of the second reference voltage circuit for comparator in the start rotation mode, FIG. 20-(*f*) that indicates the drive pulse, FIG. 20-(*g*) that indicates the analog switching control signal of the first reference voltage circuit for amplifier, FIG. 20-(*h*) that indicates the analog switching control signal of the second reference voltage circuit for amplifier, FIG. 20-(*i*) that indicates the analog switching control signal of the first reference voltage circuit for comparator, FIG. 20-(*j*) that indicates the analog switching control signal of the second reference voltage circuit for comparator in the start non-rotation mode, of the present invention. Still, in its explanation it is about the rectangular and thin type vibration motor shown in FIG. 8*a* and FIG. 8*b*, it is similar about another rectangular and thin type vibration motor shown in FIG. 9*a* and FIG. 9*b*, a coin type vibration motors shown in FIG. 23*a*, FIG. 23*b*, FIG. 24*a* and FIG. 24*b* and a fan motors in FIG. 26*a*, FIG. 26*b*, FIG. 27*a* and FIG. 27*b* after mentioned.

To start the stepping motor 80, at first, the start pulse 1' is output from the drive pulse generation circuit 54' shown in FIG. 21, and by an analog switching control signal 1*b*' which is the inversed non-pulse interval 1*a*' of the start pulse 1' (a chopper pulse doesn't occur and only the non-pulse interval 1*a*' occurs), analog switches SW1' and SW2' of the first reference voltage circuit 61' for amplifier shown in FIG. 22 is turned on, and the first reference voltage 61*b* for amplifier which is set up by resistance division of an external power supply voltage through resistors R1' and R2', as an output of the voltage follower 612' becomes the first reference voltage 61*b* for amplifier of the operational amplifier 63*a*' of the amplifier 63' shown in FIG. 22, and the first reference voltage 61*b* for amplifier (the first reference voltage 21*a* for amplifier indicated in FIG. 19-(*b*) and (*d*)) is set up higher than the upper threshold voltage 19*a*' in regards to the first reference voltage 19' for comparator consisting of the upper threshold voltage 19*a*' and the lower threshold voltage 19*b* that are outputs 65*b*' of the first reference voltage circuit 65' of the comparator 64', and in voltage waveform after amplification in the start rotation mode indicated in FIG. 19-(*b*), a counter electromotive voltage 10*b*' in the start rotation of the rotor 82 at the start pulse 1' indicated as a broken line, gets down the upper threshold voltage 19*a*' at the non-pulse interval 1*a*' just before the drive pulse 2' next of the start pulse 1', so that the start rotation/non-rotation detecting means 54*a*' which the drive pulse generation circuit 54' has, detects the rotation of the rotor 82 from the rotor position detection signal 51*a*' which the comparator 51*p* outputs, and the start rotation/non-rotation mode switching means 54*c*' inputs the start rotation signal 54*b*' which the start rotation/non-rotation detecting means 54*a*' outputs, and it goes to the start rotation mode, and next the drive pulse 2' in the start rotation mode is output by the drive pulse generation circuit 54', and the vibration motor 80 starts smoothly.

On the other hand, as indicated in FIG. 19-(*d*), in the start non-rotation mode, at a start pulse 22', as a counter electromotive voltage 30*b* which is a voltage waveform after amplification in start non-rotation and vibration of the rotor 82, indicated as a broken line, at non-pulse intervals of chopper pulses 23', 24', 25', 26' and 27', that is 22*a*', 23*a*', 24*a*', 25*a*', 26*a*' and 27*a*', is getting over an upper threshold voltage 19*a*', the start rotation/non-rotation detecting means 54*a*' which the drive pulse generation circuit 54' has, detects start non-rotation and vibration of the rotor 82 from a rotor position detection signal 51*a*' which the comparator 51*p* outputs, and the start rotation/non-rotation mode switching means 54*c*' inputs a start non-rotation signal 54*b*' which the start rotation/non-rotation detecting means 54*a*' outputs, and it goes to the start non-rotation mode, and the drive pulse generation circuit 54' outputs just after a non-pulse interval 27*a*', a drive pulse 28' next in the start non-rotation mode whose pulse width is wider than next drive pulse 2' of the start pulse 1' in the start rotation mode, and the vibration motor 80 starts smoothly.

Here, the reason why the reference voltage for amplifier is used two, and the reference voltages as reference voltage for comparator is used two, at the start pulse 1' or the start pulse 22', not either of the first reference voltage 21*a* for amplifier or the first reference voltage 19' for comparator but both are used, is explained.

The first reference voltage 21*a* for amplifier is set up near power supply voltage (Vcc), but if the reference voltage for comparator is used at drive pulses except for the start pulse 1' or the start pulse 22' and is equal to the second reference voltage 20' for comparator that is set up near ½ of power supply voltage (Vcc), the difference of voltage between the first reference voltage 21*a* for amplifier and the upper threshold voltage of the reference voltage for comparator (in the case, which becomes the upper threshold voltage 20*a*' of the second reference voltage 20' for comparator), becomes smaller than ½ of power supply voltage (Vcc), and in the start non-rotation as indicated in FIG. (d), as voltage violation of the counter electromotive voltage 30*b* at the non-pulse interval 33*a* just before the chopper pulse 34 attains near ½ of power supply voltage (Vcc), the counter electromotive voltage 30*b* gets across the upper threshold voltage of reference voltage for comparator, and the vibration motor is driven incorrectly as the start rotation mode. To avoid this, the first reference voltage for comparator which is lower than the second reference voltage for comparator is used, and the difference of voltage 219 between the first reference voltage 21*a* for amplifier and the upper threshold voltage 19*a*' of the first reference voltage for comparator is made larger than ½ of power supply voltage (Vcc), and in the results the counter electromotive voltage 30*b* doesn't get across the upper threshold voltage 19*a*' of the first reference voltage for comparator at the non-pulse interval 33*a* just before the chopper pulse 34.

The difference of voltage 219 between the first reference voltage 21*a* for amplifier and the upper threshold voltage 19*a*' of the first reference voltage 19' for comparator is made larger, the detection of the start non-rotation becomes more exact, but in a case that it is too large, in the start rotation it takes much time to detect the start rotation after the start pulse, and in the results next drive pulse 2' next of the start pulse 1' that the drive pulse generation circuit 54' outputs begins to delay from the best drive timing, and as the vibration motor gets not to be able to be accelerated sufficiently by the drive pulse, it is necessary to set up its largeness by starting performance of the rotor considered.

After the start pulse 1' or 22', the analog switching control signal 67a' of the first reference voltage circuit 61' for amplifier shown in FIG. 22, becomes "L" and analog switches SW1' and SW2' is turned off, on the other hand, the analog switching control signal 67b' of the second reference voltage circuit 62' for amplifier, becomes "H" and analog switches SW3' and SW4' is turned on, and the reference voltage working as the basis of the amplifier 63' becomes the output 62b of the voltage follower 612'. The second reference voltage 62b for amplifier is the second reference voltage 21b for amplifier indicated in FIG. 19-(b) and (d), as absolute value of its difference of voltage from the upper threshold voltage 20a' is set up smaller than absolute value of the difference voltage between the first reference 21a for amplifier and the upper threshold voltage 19a' of the first reference voltage for comparator, the time interval 8a' which it takes at a high speed rotation, for the counter electromotive voltage 17b' of the drive pulse 8' to get across the lower threshold voltage 20b', can be set up almost equal to the time interval 9a which it takes for the counter electromotive voltage 18b of the drive pulse 9' whose pulse width is equal to that of the drive pulse 8', to get across the upper threshold voltage 20a', and so that the motor can be driven efficiently and the rotor can rotate at a high speed.

Also, as the first reference voltage 21a for amplifier of the amplifier 63' can be set up higher sufficiently than the upper threshold voltage 19a' of the first reference voltage 19' of the comparator 64', at the start pulse 22' in a case of non-rotation and vibration, it isn't detected as the rotation incorrectly at the non-pulse interval 25a' just before a chopper pulse 26', and it goes to the start non-rotation mode, and at the start pulse 1' in a case of the rotation, after that, it is able to go to the rotation mode, the vibration motor can start smoothly, and especially in the vibration motor 80 onto whose rotor shaft 82b the eccentric weight 85 is secured, even if the state of position of the motor makes load of one side weight of the eccentric weight 85 increase, that has effect that the vibration motor 80 can be started smoothly.

Still, so far the explanation is that of the case that the first reference voltage 21a for amplifier is set up larger than the upper threshold voltage 19a', on the other hand, in the case that the first reference voltage 21a for amplifier is set up lower than the lower threshold voltage 19b', the direction of a bipolar drive current supplied onto the drive coil by the driver at the start pulse should be fixed inversely.

Figure 23A:
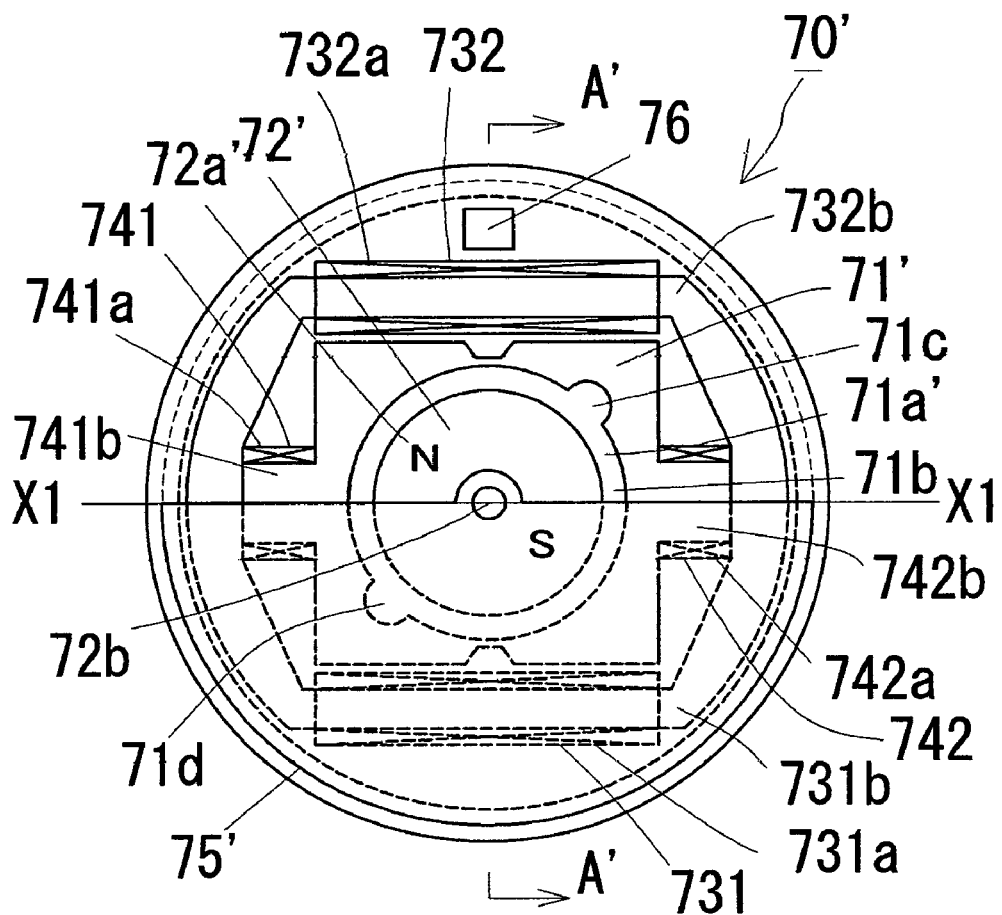
FIG. 23a and FIG. 23b show a top view, and a cross section taken on line A'-A' of FIG. 23a, of a coin type vibration motor employing the driving circuit of the present invention, respectively.
Figure 23B:
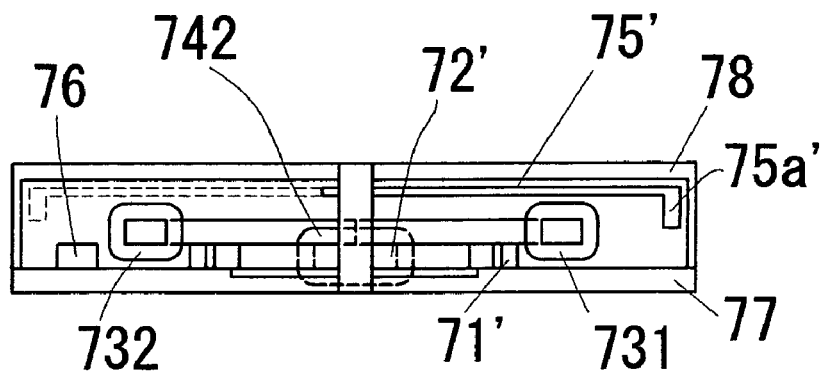

Next, in FIG. 23a a top view and in FIG. 23b a cross section taken on line A'-A' of FIG. 23a of a coin type vibration motor employing a driving circuit of the present invention, are shown. The present coin type vibration motor 70' has a shape of coin type, comprises a flat bipolar stator 71', a bipolar permanent magnet 72a' secured to rotor shaft 72b, located in a rotor hole 71a' provided on the flat stator 71', coupling magnetically to the flat stator 71' through a gap 71b and stopping with detent torque generated by notches 71c and 71d provided in rotor hole 71a', the rotor 72' sustained by a housing 78 and a basic plane 77, a drive coil 741 consisting of a coil 741a wired on a coil core part 741b provided on the flat stator 71', a drive coil 742 consisting of a coil 742a located to put the rotor 72' between and wired on a coil core part 742b provided on the flat stator 71', a drive coil 731 consisting of the coil 731a coupling magnetically to the flat stator 71' and wired on a coil core 731b, and a drive coil 732 located line-symmetrically with the drive coil 731 for line X1-X1 which passes center of the rotor 72' putting the rotor 72' between and is consisting of the coil 732a wired on the coil core 732b and an eccentric weight 75' whose thick part 75a' is located not to pile up the coil 731 or the coil 732 as shown in the cross section taken on line A'-A' of FIG. 23a in FIG. 23b and which is secured to the rotor shaft 72b.

Still, because the detailed explanation in regards of the coin type vibration motor 70', especially a drive coil, is published in Patent Document 4, its explanation is omitted.

Still, each of the drive coil 731 and 732 is separated body of U letter type, but, they are formed as a drive coil of one body ring type, furthermore, it is possible that the drive coil 731, 732, 741 and 742 are formed as one body in the flat stator 71'.

Coil turns of a coil 731a and those of a coil 732a of two of drive coils 731 and 732, of the first drive coil are equal each other, and coils 731a, 732a, 741a and 742a of four of the drive coils 731, 732, 741 and 742 of the first drive coil and the second drive coil are connected serially and forming one coil.

When the power supply is supplied to the driver IC 76 integrated to one chip that has an external terminal of only power supply (is not shown), the same drive current is supplied onto the coil 731a, 732a, 741a and 742a, the same drive current i is supplied onto the coil 731a, 732a, 741a and 742a shown in FIG. 23a, parallel synthesis of magnetomotive force of the drive coil 731 and that of the drive coil 732 works to magnetomotive force of a permanent magnet 72a' mainly through magnetic resistance of a gap 71b serially with magnetomotive force of the drive coil 741 and that of the drive coil 742, the rotor 72' rotates at a high speed, centrifugal force works on the eccentric weight 75' and vibration of the motor is generated, the vibration motor 70' functions as a vibration motor.

Figure 24A:
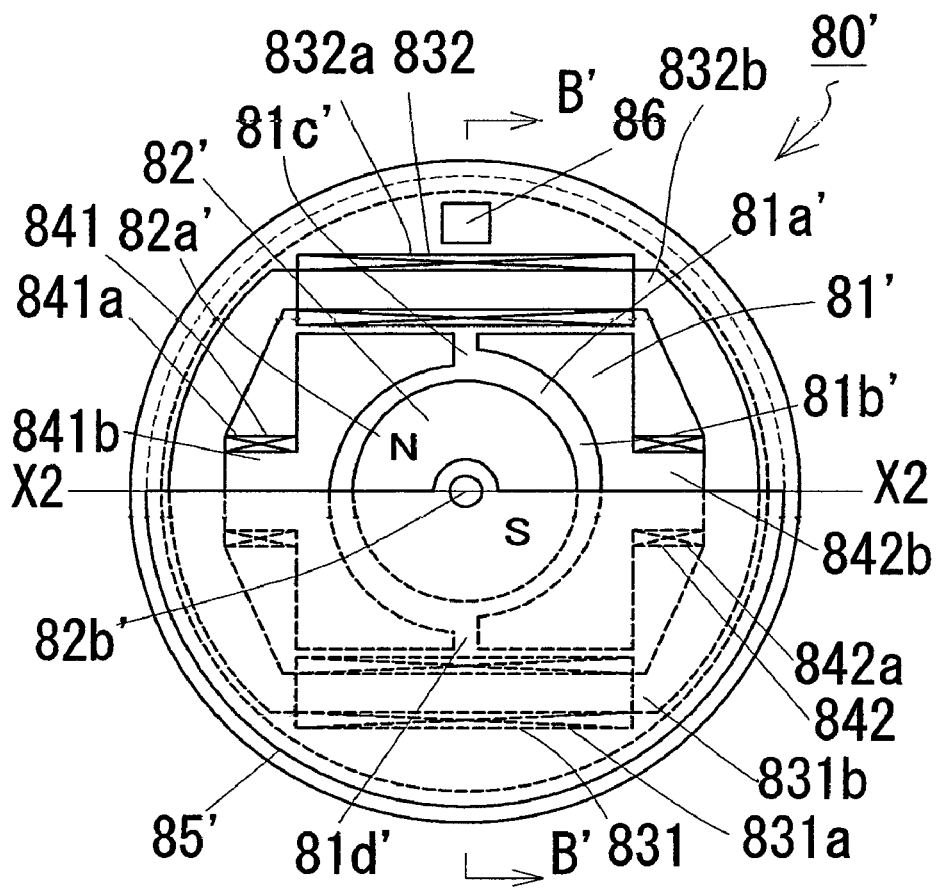
FIG. 24a and FIG. 24b show a top view, and a cross section taken on line B'-B' of FIG. 24a, of another coin type vibration motor employing the driving circuit of the present invention, respectively.
Figure 24B:
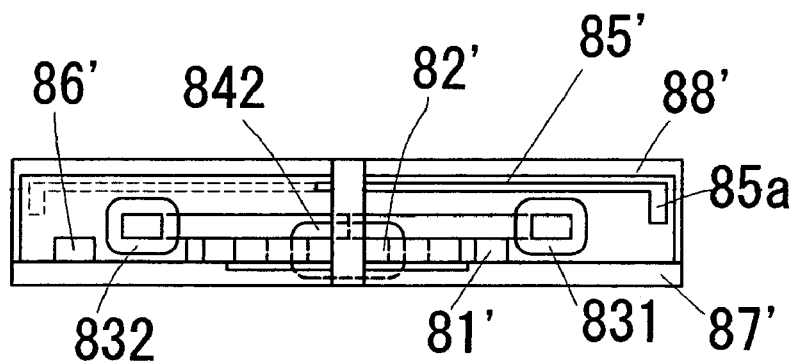

Next, in FIG. 24a a top view and in FIG. 24b a cross section taken on line B'-B' of FIG. 24a of another coin-type vibration motor employing the driving circuit of the present invention. Another coin type vibration motor 80' of the present invention has a shape of coin type as similarly with the coin-type vibration motor 70' of the present invention shown in FIG. 23a and FIG. 23b, and the difference point is that in the rotor hole 81a' of the two pole flat stator 81', not notches 71c and 71d provided in the rotor hole 71a' to generate detent torque, but steps 81c' and 81d' are provided. Because the structure except for that mentioned are the same, its explanation is omitted.

Figure 25A:
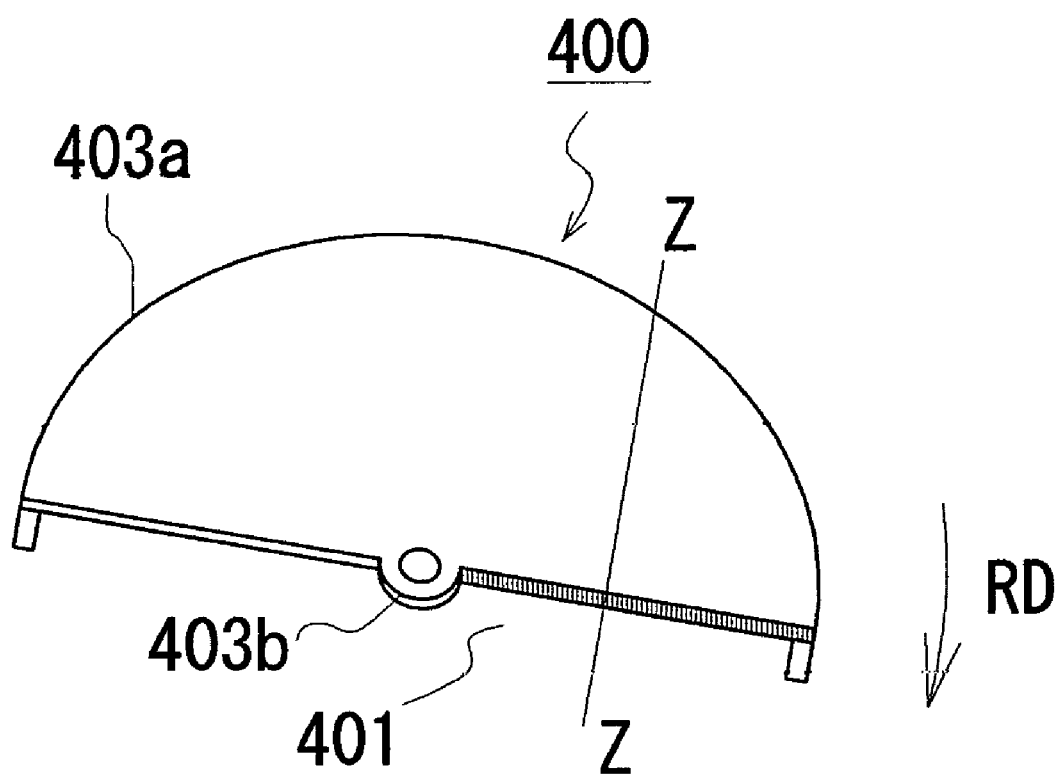
FIG. 25a and FIG. 25b show an oblique view, and a cross section taken on line Z-Z of FIG. 25a, of a rotational weight whose front part of its side part has a shape of streamline.
Figure 25B:
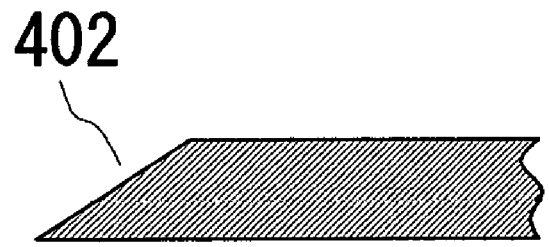

In FIG. 25a and FIG. 25b, a rotational weight whose front part of its side part has a shape of streamline is shown. The rotational weight 400 in oblique view which FIG. 25a shows has a shape of a half disc, and a hatched front part 401 of its side part except for cylindrical parts 403a and 403b has a taper part 402 of streamline shown in a cross section taken on line Z-Z of FIG. 25a (FIG. 25b), which in a rotation direction RD of the rotational weight works to weaken air resistance, especially exhibits the effect at a high speed rotation and in the same drive pulses has the effect to increase rotation frequency compared with the rotational weight without the taper part 402. That mentioned structure can be employed to not only the rotational weight of the coin type vibration motor shown in FIG. 23a, FIG. 23b, FIG. 24a and FIG. 24b but also that of the rectangular and thin type vibration motor in FIG. 8 and FIG. 9.

Figure 26A:
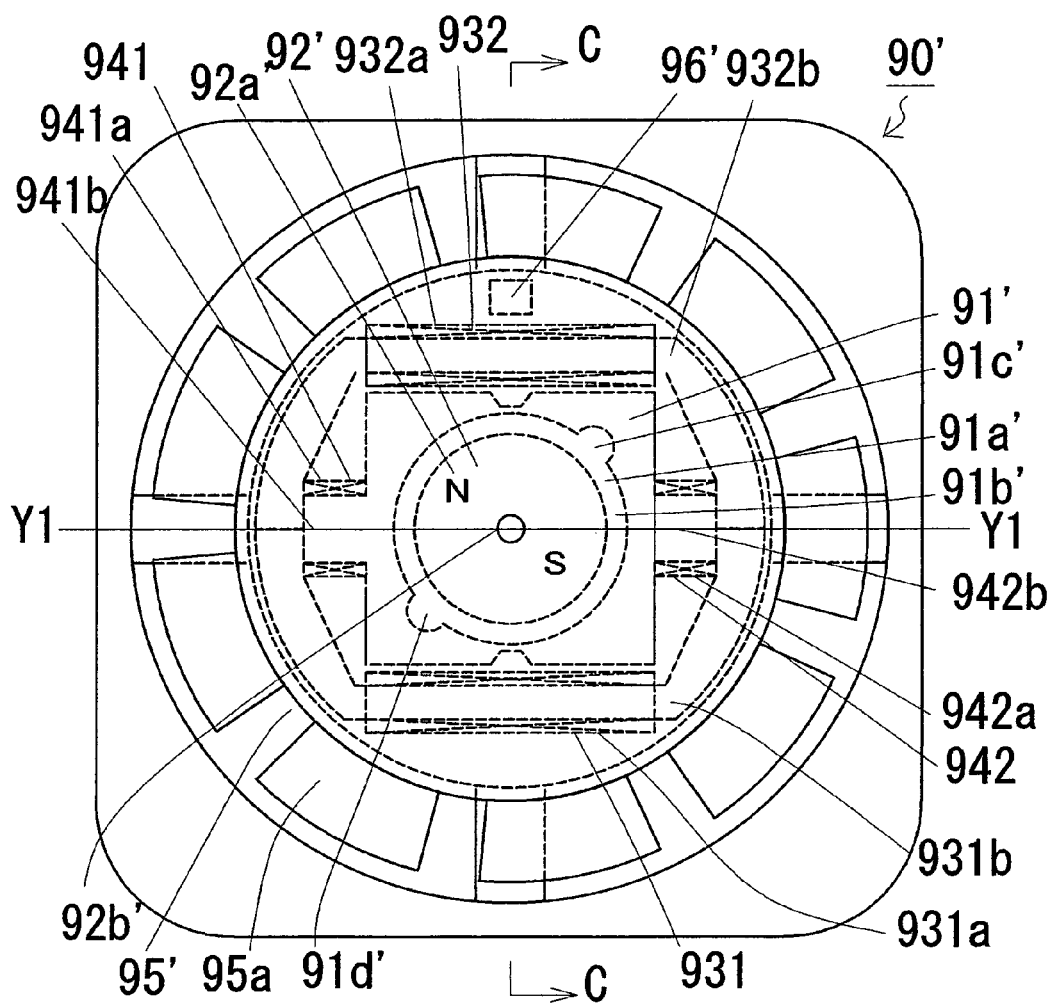
FIG. 26a and FIG. 26b show a top view, and a cross section taken on line C'-C' of FIG. 26a, of a fan motor employing the driving circuit of the present invention, respectively.
Figure 26B:
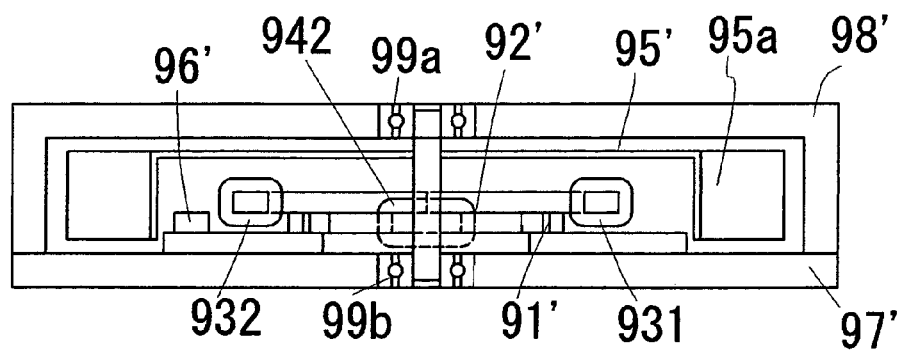

In FIG. 26a a top view and In FIG. 26b a cross section taken on line C-C of FIG. 26a of a fan motor employing the driving circuit of the present invention, are shown. The fan motor 90' of the present invention comprises a two pole flat stator 91', a bipolar permanent magnet 92a' secured to a rotor shaft 92b' located in a rotor hole 91a' provided on the flat stator 91', coupling magnetically to the flat stator 91' through a gap 91b', stopping with detent torque generated by notches 91c' and 91d' provided with the rotor hole 91a', the rotor 92' sustained by bearings 99a and 99b, a drive coil 941 consisting of a coil 941a wired on a coil core part 941b provided on the flat stator 91', a drive coil 942 consisting of coil 942a located to put the rotor 92' between and wired on a coil core part 942b provided with the flat stator 91', a drive coil 931 consisting of a coil 931a coupling magnetically to the flat stator 91' and wired on a coil core 931b, a drive coil 932 located line-symmetrically with a drive coil 931 for a line Y1-Y1 which passes center of the rotor 92' putting the rotor 92' between and is consisting of a coil 932a wired on the coil core 932b and a fan body 95' whose fan 95a is located not to pile up the coil 931 or the coil 932 and which is secured to the rotor shaft 92b'.

The fan 95a is an axial stream fan, but it is possible that it is changed to a radial stream fan. Also, it is possible that the bearings 99a and 99b are changed to dynamic ones.

Figure 27A:
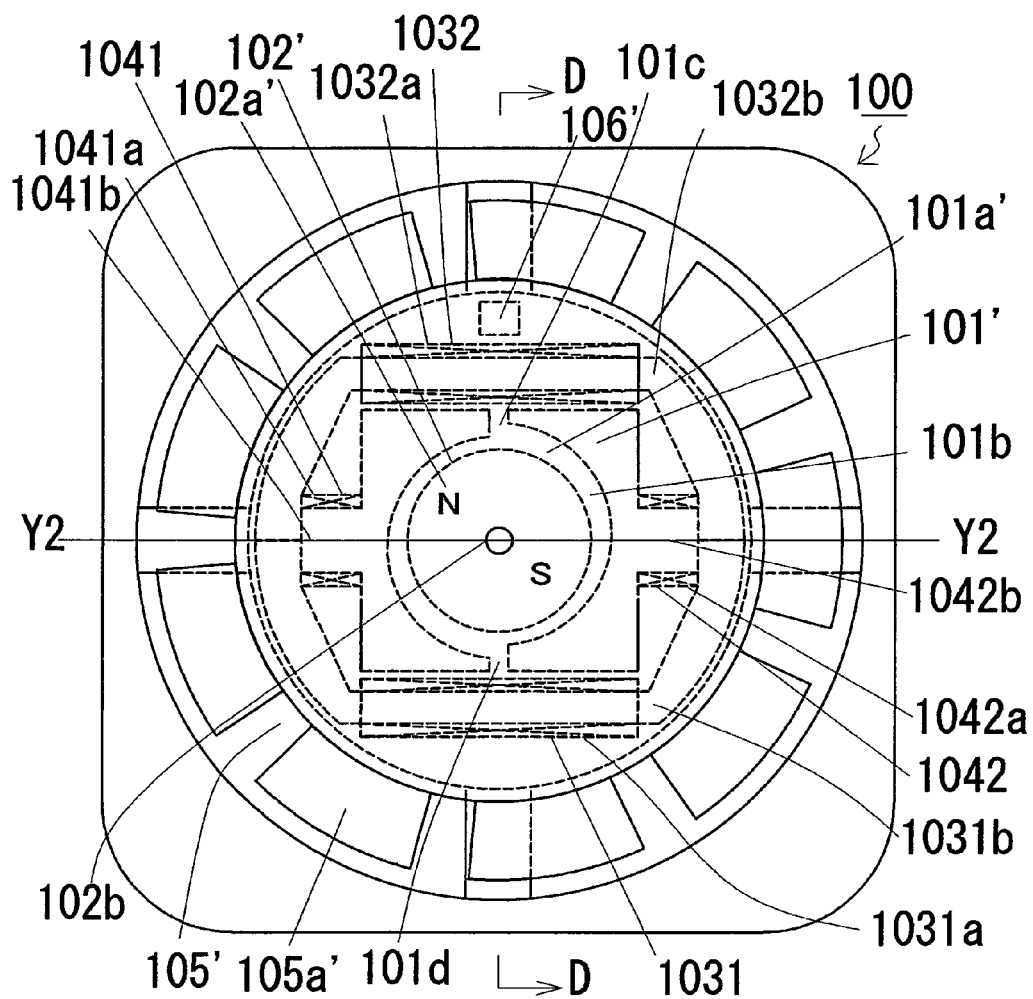
FIG. 27a and FIG. 27b show a top view, and a cross section taken on line D'-D' of FIG. 27a, of another fan motor employing the driving circuit of the present invention, respectively.
Figure 27B:
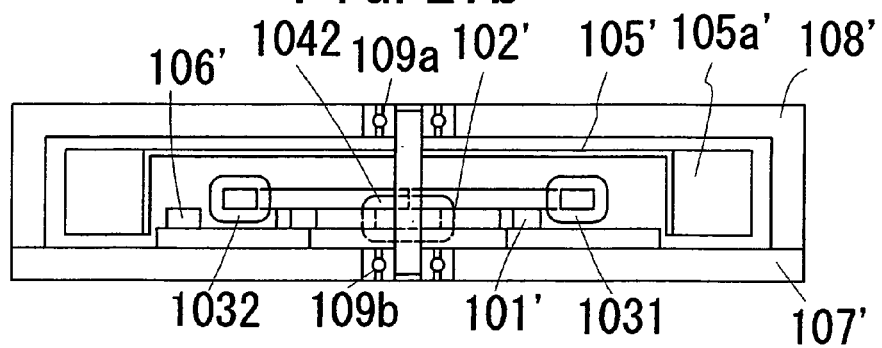

Next, in FIG. 27a a top view and in FIG. 27b a cross section taken on line D-D of FIG. 27a of another fan motor employing the driving circuit of the present invention, are shown. The difference point with the fan motor 90' employing the driving circuit shown in FIG. 9a and FIG. 9b is that of a rotor hole 101a' of a two pole flat stator 101', not notches 91c' and 91d' provided in the rotor hole 91a' to generate detent torque but steps 101c and 101d are provided. Because the structure except for that mentioned are the same, its explanation is omitted.

POSSIBILITY OF INDUSTRIAL USE

As the present invention has the effect that it can give the motor starting performance and high speed performance when the vibration motor employing a brushless and low power consumption stepping motor is used, external power supply connecting to the driving circuit being turned on or off frequently, the vibration motor can be changed for the conventional vibration motor with a brush installed in a electronic equipment as a portable phone. Besides, the fan motor employing the present invention, has the starting performance and the high speed performance, and is useful as a cooling functional device for a electronic equipment as a portable phone.

The invention claimed is:

1. A motor driven electronic apparatus comprising:
a stepping motor including a two pole flat stator, a rotor including a two pole permanent magnet coupling magnetically with the two pole flat stator through a gap, stopping with detent torque and secured to the rotor shaft, and a drive coil;
an amplifier constituting a rotor position detector and amplifying a counter electromotive voltage generated on the drive coil by motion of the rotor on the basis of a reference voltage for amplifier;
a comparator constituting the rotor position detector, detecting a rotor position from an output of the amplifier and having hysteresis including an upper threshold voltage and a lower threshold voltage on the basis of a reference voltage for comparator outputted by a reference voltage circuit for comparator;
a drive pulse generation circuit generating a drive pulse at timing of the rotor position; and a driver supplying a bipolar drive current corresponding to the drive pulse onto the drive coil and driving the stepping motor, wherein at least any one of the reference voltages used for the amplifier or the reference voltages used for the comparator are more than one.

2. The motor driven electronic apparatus according to claim 1, wherein the reference voltages used for amplifier are more than one and the reference voltage used for comparator is one, or the reference voltage used for the amplifier is one and the reference voltages used for the comparator are more than one.

3. The motor driven electronic apparatus according to claim 2, wherein the reference voltage used for amplifier is two and the reference voltage used for comparator is one, the reference voltage for amplifier is made able to be set up either a first reference voltage for amplifier which is larger than the upper threshold voltage or is smaller than the lower threshold voltage, on the basis of the reference voltage of the comparator, or a second reference voltage for amplifier whose absolute value of the difference of voltage is smaller than that of the first reference voltage for amplifier, from the reference voltage for comparator, and is set up the first reference voltage for amplifier only at a start pulse with chopper pulses, and furthermore the direction of the drive current supplied onto the drive coil at the start pulse is fixed to any one of sides of bipolarity, corresponding to whether the first reference voltage for amplifier is larger than the upper threshold voltage, or is smaller than the lower threshold voltage, on the basis of the reference voltage of the comparator.

4. The motor driven electronic apparatus according to claim 3, wherein the difference of voltage between the first reference voltage for amplifier, and the upper threshold voltage or the lower threshold voltage on the basis of the reference voltage of the comparator, is set up on the basis that whether, at the start pulse, the rotor has started (Has a start rotation mode started?) or the rotor has started not to rotate but to vibrate (Has a start non-rotation mode started?) is judged exactly and the rotor can start.

5. The motor driven electronic apparatus according to claim 3, wherein the difference of voltage between the second reference voltage for amplifier and the reference voltage for comparator is set up on the basis that a time interval between drive pulses adjacent each other whose pulse width is equal, is made equal at a high speed rotation of the stepping motor.

6. The motor driven electronic apparatus according to claim 2, wherein the reference voltage used for amplifier is one and the reference voltage used for comparator is two, the reference voltage for comparator is made able to be set up either the first reference voltage for comparator whose upper threshold voltage is smaller or lower threshold voltage is larger than the reference voltage for amplifier, on the basis of the first reference voltage of the comparator, or the second reference voltage for comparator whose absolute value of the difference of voltage, is smaller than that of the first reference voltage for comparator, from the reference voltage for amplifier, and is set up the first reference voltage for comparator only at the start pulse with chopper pulses, and furthermore the direction of the drive current supplied onto the drive coil at the start pulse, is fixed to any one of sides of bipolarity, corresponding to whether the reference voltage for amplifier is larger than the upper threshold voltage, or is smaller than the lower threshold voltage, on the basis of the first reference voltage of the comparator.

7. The motor driven electronic apparatus according to claim 6, wherein the difference of voltage between the reference voltage for amplifier, and the upper threshold voltage or the lower threshold voltage on the basis of the first reference voltage of the comparator, is set up on the basis that whether, at the start pulse, the rotor has started (Has the start rotation mode started?) or the rotor has started not to rotate but to vibrate (Has the start non-rotation mode started?) is judged exactly and the rotor can start.

8. The motor driven electronic apparatus according to claim 6, wherein the difference of voltage between the reference voltage for amplifier and the second reference voltage for comparator is set up on the basis that the time interval between the drive pulses adjacent each other whose pulse width is equal, is made equal at a high speed rotation of the stepping motor.

9. The motor driven electronic apparatus according to claim 2,
wherein a reference voltage input terminal of the amplifier, only at the start pulse with the chopper pulses, is connected to the first reference voltage circuit for amplifier constituting the rotor position detector and outputting the first reference voltage for amplifier that is larger than the upper threshold voltage or smaller than the lower threshold voltage, on the basis of the reference voltage of the comparator, and furthermore except for the start pulse with the chopper pulses, is connected to the second reference voltage circuit for amplifier constituting the rotor position detector and outputting the second reference voltage for amplifier whose absolute value of the difference of voltage is smaller than that of the first reference voltage for amplifier, from the reference voltage for comparator.

10. The motor driven electronic apparatus according to claim 2,
wherein a reference voltage input terminal of the comparator, only at the start pulse with the chopper pulses, is connected to the first reference voltage circuit for comparator constituting the rotor position detector, outputting the first reference voltage for comparator whose upper threshold voltage is smaller or lower threshold voltage is larger, on the basis of the first reference voltage of the comparator, than the reference voltage for amplifier which the reference voltage circuit for amplifier outputs, and furthermore, except for the start pulse with the chopper pulses, is connected to the second reference voltage circuit for comparator constituting the rotor position detector and outputting the second reference voltage for comparator whose absolute value of the difference of voltage is smaller than that of the first reference voltage for comparator, from the reference voltage for amplifier.

11. The motor driven electronic apparatus according to claim 1, wherein the reference voltage for amplifier is used n of more than one, including the first reference voltage for amplifier and a m-th reference voltage for amplifier (m=2 to n) and the reference voltage for comparator is used n of more than one, including the first reference voltage for comparator which makes a pair with the first reference voltage for amplifier and a m-th reference voltage for comparator (m=2 to n) which makes a pair with the m-th reference voltage for amplifier.

12. The motor driven electronic apparatus according to claim 11, wherein the reference voltage for amplifier is made able to be set up any one of the first reference voltage for amplifier which is larger than the upper threshold voltage or a power supply voltage, or is smaller than the lower threshold voltage or a power supply ground on the basis of the first reference voltage of the comparator, and the m-th reference voltage for amplifier whose absolute value of the difference of voltage from the m-th reference voltage for comparator is smaller than that between the first reference voltage for amplifier and the first reference voltage for comparator, similarly the reference voltage for comparator is made able to be set up any one of the first reference voltage for comparator and the m-th reference voltage for comparator, they are set up the first reference voltage for amplifier and the first reference voltage for comparator only at the start pulse with chopper pulses, respectively, and except for the start pulse with chopper pulses are set up the m-th reference voltage for amplifier and the m-th reference voltage for comparator, respectively, and furthermore the direction of the drive current which is supplied onto the drive coil at the start pulse is fixed to any one of sides of bipolarity, corresponding to whether the first reference voltage for amplifier is larger than the upper threshold voltage or is smaller than the lower threshold voltage on the basis of the first reference voltage of the comparator.

13. The motor driven electronic apparatus according to claim 11, wherein the difference of voltage between the first reference voltage for amplifier and the upper threshold voltage or the lower threshold voltage on the basis of the first reference voltage of the comparator, is set up on the basis that whether, at the start pulse, the rotor has started (Has the start rotation mode started?) or the rotor has started not to rotate but to vibrate (Has the start non-rotation mode started?) is judged exactly and the rotor can start.

14. The motor driven electronic apparatus according to claim 11, wherein the difference of voltage between the nth reference voltage for amplifier and the nth reference voltage for comparator is set up on the basis that the time interval between the drive pulses adjacent each other whose pulse width is equal, is made equal at a high speed rotation of the stepping motor.

15. The motor driven electronic apparatus according to claim 11, wherein the difference of voltage between the first reference voltage for amplifier, and the upper threshold voltage or the lower threshold voltage on the basis of the first reference voltage of the comparator, is made larger than ½ voltage of the power supply.

16. The motor driven electronic apparatus according to claim 11, wherein n=2.

17. The motor driven electronic apparatus according to claim 11,
wherein the reference voltage input terminal of the amplifier, only at the start pulse with the chopper pulses, is connected to the first reference voltage circuit for amplifier constituting the rotor position detector, outputting the first reference voltage for amplifier that is larger than the upper threshold voltage or the power supply voltage, or smaller than the lower threshold voltage or the power supply ground, and a reference voltage input terminal of the comparator is connected to the first reference voltage circuit for comparator outputting the first reference voltage for comparator, and furthermore except for the start pulse with the chopper pulses, the reference voltage input terminal of the amplifier is connected to the m-th reference voltage circuit for amplifier constituting the rotor position detector, outputting the m-th reference voltage for amplifier (m=2 to n) whose difference of voltage from the m-th reference voltage for comparator (m=2 to n) is smaller than that of between the first reference voltage for amplifier and the first reference voltage for comparator, and the reference voltage input terminal for the comparator is connected to the m-th reference voltage circuit for comparator outputting the m-th reference voltage for comparator, and furthermore the drive pulse generation circuit fixes the direction of the drive current supplied onto the drive coil by the start pulse to any one of sides of bipolarity, corresponding to whether the first reference voltage for amplifier is larger than the upper threshold voltage or smaller than lower threshold voltage on the basis of the first reference voltage of the comparator.

18. The motor driven electronic apparatus according to claim 17, wherein n=2.

19. The motor driven electronic apparatus according to claim 17, wherein the stepping motor comprises a vibration motor with a driver IC in which the driving circuit is integrated to one chip, and a rotational weight.

20. The motor driven electronic apparatus according to claim 19, wherein the rotational weight has a shape of a half disc and its front part on at least the direction of rotation in a side part except for a cylindrical part has a shape of streamline.

21. The motor driven electronic apparatus according to claim 17, wherein the stepping motor comprises a fan motor with the driver IC in which the driving circuit is integrated to one chip, and a fan.

* * * * *